United States Patent
Roumeliotis et al.

(10) Patent No.: US 9,607,401 B2
(45) Date of Patent: Mar. 28, 2017

(54) CONSTRAINED KEY FRAME LOCALIZATION AND MAPPING FOR VISION-AIDED INERTIAL NAVIGATION

(71) Applicant: Regents of the University of Minnesota, Minneapolis, MN (US)

(72) Inventors: Stergios I. Roumeliotis, Saint Paul, MN (US); Esha D. Nerurkar, Mountian View, CA (US)

(73) Assignee: Regents of the University of Minnesota, Minneapolis, MN (US)

( * ) Notice: Subject to any disclaimer, the term of this patent is extended or adjusted under 35 U.S.C. 154(b) by 374 days.

(21) Appl. No.: 14/271,971

(22) Filed: May 7, 2014

(65) Prior Publication Data
US 2014/0333741 A1 Nov. 13, 2014

Related U.S. Application Data

(60) Provisional application No. 61/821,136, filed on May 8, 2013.

(51) Int. Cl.
*G06T 7/20* (2017.01)
*G01S 5/16* (2006.01)
*G01C 21/16* (2006.01)

(52) U.S. Cl.
CPC .......... *G06T 7/2033* (2013.01); *G01C 21/165* (2013.01); *G01S 5/16* (2013.01);
(Continued)

(58) Field of Classification Search
CPC ......... G06T 7/2033; G06T 2207/10016; G06T 2207/30241; G06T 2207/30244; G01S 5/16; G01C 21/165
See application file for complete search history.

(56) References Cited

U.S. PATENT DOCUMENTS 5,847,755 A 12/1998 Wixson et al.
7,015,831 B2 3/2006 Karlsson et al.
(Continued)

FOREIGN PATENT DOCUMENTS

WO 2015013418 A2 1/2015
WO WO 2015013534 A1 1/2015

OTHER PUBLICATIONS

Ait-Aider et al., "Simultaneous object pose and velocity computation using a single view from a rolling shutter camera," Proceedings of the IEEE European Conference on Computer Vision, May 7-13, 2006, pp. 56-68.
(Continued)

*Primary Examiner* — Tat Chio
(74) *Attorney, Agent, or Firm* — Shumaker & Sieffert, P.A.

(57) ABSTRACT

Estimation techniques for vision-aided inertial navigation are described. In one example, a vision-aided inertial navigation system (VINS) comprises an image source to produce image data for a keyframe and one or more non-keyframes along a trajectory, the one or more non-keyframes preceding the keyframe along the trajectory. The VINS comprises an inertial measurement unit (IMU) to produce IMU data indicative of a motion of the VINS along the trajectory for the keyframe and the one or more non-keyframes, and a processing unit comprising an estimator that processes the IMU data and the image data to compute state estimates of the VINS. The estimator computes the state estimates of the VINS for the keyframe by constraining the state estimates based on the IMU data and the image data for the one or more non-keyframes of the VINS without computing state estimates of the VINS for the one or more non-keyframes.

27 Claims, 7 Drawing Sheets

(52) U.S. Cl.
CPC ............... *G06T 2207/10016* (2013.01); *G06T 2207/30241* (2013.01); *G06T 2207/30244* (2013.01)

(56) References Cited

U.S. PATENT DOCUMENTS

| | | | |
|---|---|---|---|
| 7,162,338 | B2 | 1/2007 | Goncalves et al. |
| 7,991,576 | B2 | 8/2011 | Roumeliotis |
| 8,577,539 | B1* | 11/2013 | Morrison ............ G01C 21/165 701/28 |
| 2002/0198632 | A1 | 12/2002 | Breed et al. |
| 2004/0073360 | A1 | 4/2004 | Foxlin |
| 2004/0167667 | A1 | 8/2004 | Goncalves et al. |
| 2008/0167814 | A1 | 7/2008 | Samarasekera et al. |
| 2008/0279421 | A1 | 11/2008 | Hamza et al. |
| 2009/0248304 | A1 | 10/2009 | Roumeliotis et al. |
| 2010/0110187 | A1 | 5/2010 | von Flotow et al. |
| 2012/0121161 | A1* | 5/2012 | Eade .................... G09B 29/007 382/153 |
| 2012/0194517 | A1 | 8/2012 | Izadi et al. |
| 2014/0316698 | A1 | 10/2014 | Roumeliotis et al. |

OTHER PUBLICATIONS

Baker et al., "Removing rolling shutter wobble," Proceedings of the IEEE Conference on Computer Vision and Pattern Recognition, Jun. 13-18, 2010, pp. 2392-2399.

Bayard et al., "An Estimation Algorithm for Vision-Based Exploration of Small Bodies in Space," 2005 American Control Conference, Jun. 8-10, 2005, pp. 4589-4595.

Bierman, "Factorization Methods for Discrete Sequential Estimation," Mathematics in Science and Engineering, Academic Press, vol. 128, 1977, 259 pp.

Boyd et al., "Convex Optimization," Cambridge University Press, 2004, 730 pp. (Applicant points out that, in accordance with MPEP 609.04(a), the 2004 year of publication is sufficiently earlier than the effective U.S. filed and any foreign priority date of May 7, 2014 so that the particular month of publication is not in issue.).

Breckenridge, "Interoffice Memorandum to T. K. Brown, Quaternions—Proposed Standard Conventions," I0M 343-79-1199, Oct. 31, 1979, 12 pp.

Lucas et al., "An iterative image registration technique with an application to stereo vision," Proceedings of 7th the International Joint Conference on Artificial Intelligence, Aug. 24-28, 1981, pp, 674-679.

Chiu et al., "Robust vision-aided navigation using sliding-window factor graphs," 2013 IEEE International Conference on Robotics and Automation, May 6-10, 2013, pp. 46-53.

Chiuso et al., "Structure From Motion Causally Integrated Over Time," IEEE Transactions on Pattern Analysis and Machine Intelligence, vol. 24, No. 4, Apr. 2002, pp. 523-535.

Davison et al., "Simultaneous Localization and Map-Building Using Active Vision," Jun. 2001, 18 pp.

Deans "Maximally Informative Statistics for Localization and Mapping," Proceedings of the 2002 IEEE International Conference on Robotics & Automation, May 2002, pp. 1824-1829.

Diel, "Stochastic Constraints for Vision-Aided Inertial Navigation," Massachusetts Institute of Technology, Department of Mechanical Engineering, Master Thesis, Jan. 2005, 106 pp.

Eade et al., "Scalable Monocular SLAM," Proceedings of the 2006 IEEE Computer Society Conference on Computer Vision and Pattern Recognition (CVPR '06), vol. 1, Jun. 17-22, 2006, 8 pp.

Eustice et al., "Visually Navigating the RMS Titanic With SLAM Information Filters," Proceedings of Robotics Science and Systems, Jun. 2005, 9 pp.

Furgale et al., "Unified temporal and spatial calibration for multi-sensor systems," Proceedings of the IEEE/RSJ International Conference on Intelligent Robots and Systems, Nov. 3-7, 2013, pp. 1280-1286.

Garcia et al., "Augmented State Kalman Filtering for AUV Navigation." Proceedings of the 2002 IEEE International Conference on Robotics & Automation, May 2002, 6 pp.

Golub et al., "Matrix Computations, Third Edition," The Johns Hopkins University Press, 2012, 723 pp. (Applicant points out that, in accordance with MPEP 609.04(a), the 2012 year of publication is sufficiently earlier than the effective U.S. filed and any foreign priority date of May 7, 2014 so that the particular month of publication is not in issue.).

Guo et al., "IMU-RGBD camera 3D pose estimation and extrinsic calibration: Observability analysis and consistency improvement," Proceedings of the IEEE International Conference on Robotics and Automation, May 6-10, 2013, pp. 2920-2927.

Harris et al., "A combined corner and edge detector," Proceedings of the Alvey Vision Conference, Aug. 31-Sep. 2, 1988, pp. 147-151.

Hesch et al., "Consistency analysis and improvement of vision-aided inertial navigation," IEEE Transactions on Robotics, vol. 30, No. 1, Feb. 2014, pp. 158-176.

Horn et al., "Closed-form solution of absolute orientation using orthonormal matrices," Journal of the Optical Society of America A, vol. 5, No. 7, Jul. 1988, pp. 1127-1135.

Huang et al., "Observability-based rules for designing consistent EKF slam estimator" International Journal of Robotics Research, vol. 29, No. 5, Apr. 2010, pp. 502-528.

Huster, "Relative Position Sensing by Fusing Monocular Vision and Inertial Rate Sensors," Stanford University, Department of Electrical Engineering, Dissertation, Jul. 2003, 158 pp.

Jia et al., "Probabilistic 3-D motion estimation for rolling shutter video rectification from visual and inertial measurements," Proceedings of the IEEE International Workshop on Multimedia Signal Processing, Sep. 2012, pp. 203-208.

Kelly et al., "A general framework for temporal calibration of multiple proprioceptive and exteroceptive sensors," Proceedings of International Symposium on Experimental Robotics, Dec. 18-21, 2010, 15 pp.

Kelly et al., "Visual-inertial sensor fusion: Localization, mapping and sensor-to-sensor self-calibration," International Journal of Robotics Research, vol. 30, No. 1, Jan. 2011, pp. 56-79.

Kneip et al., "Robust Real-Time Visual Odometry with a Single Camera and an IMU," Proceedings of the British Machine Vision Conference, Aug. 29-Sep. 2, 2011, pp. 16.1-16.11.

Kottas et al., "An iterative Kalman smoother for robust 3D localization on mobile and wearable devices," Proceedings of the IEEE International Conference on Robotics and Automation, May 26-30, 2015, pp. 6336-6343.

Kottas et al., "Detecting and dealing with hovering maneuvers in vision-aided inertial navigation systems," Proceedings of the IEEE/RSJ International Conference on Intelligent Robots and Systems, Nov. 3-7, 2013, pp. 3172-3179.

Kottas et al., "Efficient and Consistent Vision-aided Inertial Navigation using Line Observations," Department of Computer Science & Engineering, University of Minnesota, MARS Lab, TR-2012-002, Sep. 2012, 14 pp.

Langelaan, "State Estimation for Autonomous Flight in Cluttered Environments," Stanford University, Department of Aeronautics and Astronautics, Dissertation, Mar. 2006, 128 pp.

Li et al., "3-D motion estimation and online temporal calibration for camera-IMU systems," Proceedings of the IEEE International Conference on Robotics and Automation, May 6-10, 2013, pp. 5709-5716.

Li et al., "Real-time Motion Tracking on a Cellphone using Inertial Sensing and a Rolling-Shutter Camera," 2013 IEEE International Conference on Robotics and Automation (ICRA), May 6-10, 2013, 8 pp.

Li et al., "Vision-aided inertial navigation with rolling-shutter cameras," The International Journal of Robotics Research, retrieved from ijr.sagepub.com on May 22, 2015, 18 pp.

Lii et al., "Multi-aided inertial navigation for ground vehicles in outdoor uneven environments," Proceedings of the IEEE International Conference on Robotics and Automation, Apr. 18-22, 2005, pp. 4703-4708.

(56) References Cited

OTHER PUBLICATIONS

Lowe, "Distinctive Image Features From Scale-Invariant Keypoints," International Journal of Computer Vision, Jan. 5, 2004, 28 pp.

McLauchlan, "The Variable State Dimension Filter Applied to Surface-Based Structure From Motion CVSSP Technical Report VSSP-TR-4/99," University of Surrey, Department of Electrical Engineering, Dec. 1999, 52 pp.

Montiel et al., "Unified Inverse Depth Parametrization for Monocular SLAM," Proceedings of Robotics: Science and Systems II (RSS-06), Aug. 16-19, 2006, 8 pp.

Mourikis et al., "On the Treatment of Relative-Pose Measurements for Mobile Robot Localization," Proceedings of the 2006 IEEE International Conference on Robotics and Automation, May 2006, pp. 2277-2284.

Nister et al., "Visual Odometry for Ground Vehicle Applications," Journal of Field Robotics, vol. 23, No. 1, Jan. 2006, 35 pp.

Oliensis, "A New Structure From Motion Ambiguity," -IEEE Transactions on Pattern Analysis and Machine Intelligence, vol. 22, No. 7, Jul. 2000, 30 pp.

Ong et al., "Six DoF Decentralised SLAM," Proceedings of the Australasian Conference on Robotics and Automation, 2003, 10 pp. (Applicant points out that, in accordance with MPEP 609.04(a), the 2003 year of publication is sufficiently earlier than the effective U.S. filed and any foreign priority date of May 7, 2014 so that the particular month of publication is not in issue.).

Oth et al., "Rotting shutter camera calibration," Proceedings of the IEEE Conference on Computer Vision and Pattern Recognition, Jun. 23-28, 2013, pp. 1360-1367.

Prazenica et al., "Vision-Based Kalman Filtering for Aircraft State Estimation and Structure From Motion," AIAA Guidance, Navigation, and Control Conference and Exhibit, Aug. 15-18, 2005, 13 pp.

Roumeliotis et al., "Augmenting Inertial Navigation With Image-Based Motion Estimation," IEEE International Conference on Robotics and Automation, vol. 4, 2002, 8 pp. (Applicant points out that, in accordance with MPEP 609.04(a), the 2002 year of publication is sufficiently earlier than the effective U.S. filed and any foreign priority date of May 7, 2014 so that the particular month of publication is not in issue.).

Shoemake et al., "Animating rotation with quatemion curves," ACM SIGGRAPH Computer Graphics, vol. 19, No. 3, Jul. 22-26, 1985, pp. 245-254.

Soatto et al., "Motion Estimation via Dynamic Vision," IEEE Transactions on Automatic Control, vol. 41, No. 3, Mar. 1996, pp. 393-413.

Soatto et al., "Recursive 3-D Visual Motion Estimation Using Subspace Constraints," International Journal of Computer Vision, vol. 22, No. 3, Mar. 1997, pp. 235-259.

Strelow, "Motion Estimation From Image and Inertial Measurements," Carnegie Mellon University, School of Computer Science, Dissertation, CMU-CS-04-178, Nov. 2004, 164 pp.

Triggs et al., "Bundle Adjustment—A Modern Synthesis," Vision Algorithms: Theory & Practice, LNCS 1883, Apr. 12, 2002, 71 pp.

Bouguet, "Camera Calibration Toolbox for Matlab," retrieved from http://www.vision.caltech.edu/bouguetj/calib_doc/., Oct. 14, 2015, 5 pp.

Dong-Si et al., "Motion Tracking with Fixed-lag Smoothing: Algorithm and Consistency Analysis," Proceedings of the IEEE International Conference on Robotics and Automation, May 9-13, 2011, 8 pp.

Golub et al., "Matrix Computations, Fourth Edition," The Johns Hopkins University Press, 2013, 780 pp.

Leutenegger et al., "Keyframe-based visual-inertial odometry using nonlinear optimization," The International Journal of Robotics Research, vol. 34, No. 3, Mar. 2015, pp. 314-334.

Li et al., "Optimization-Based Estimator Design for Visual-Aided Inertial Navigation," Proceedings of the Robotics: Science and Systems Conference, Jul. 9-13, 2012, 8 pp.

Mourikis et at, "A Dual-Layer Estimator Architecture for Long-term Localization," Proceedings of the Workshop on Visual Localization for Mobile Platforms, Jun. 24-26, 2008, 8 pp.

Nerurkar et al., "C-KLAM: Constrained Keyframe-Based Localization and Mapping," Proceedings of the IEEE International Conference on Robotics and Automation, May 31-Jun. 7, 2014, 6 pp.

"Project Tango," retrieved from https://www.google.com/atap/projecttango on Nov. 2, 2015, 4 pp.

Triggs et al., "Bundle Adjustment—A Modern Synthesis," Proceedings of the International Workshop on Vision Algorithms: Theory and Practice, Lecture Notes in Computer Science, vol. 1883, Sep. 21-22, 1999, pp. 298-372.

U.S. Appl. No, 14/733,468, by Stergios I. Roumeliotis et al., filed Jun. 8, 2015.

U.S. Appl. No. 14/796,57.4, by Stergios I. Roumeliotis et al., filed Jul. 10, 2015.

Ayache et al., "Maintaining Representations of the Environment of a Mobile Robot," IEEE Trans. Robot. Autom., vol. 5(6), Dec. 1989, pp. 804-819.

Bartoli et al., "Structure from Motion Using Lines: Respresentation, Triangulation and Bundle Adjustment," Computer Vision and Image Understanding, vol. 100(3), Dec. 2005, pp. 416-441.

Canny, "A Computational Approach to Edge Detection," IEEE Trans. Pall. Analy. Machine Intell., vol. 8(6), Nov. 1986, pp. 679-698.

Chen, "Pose Determination from Line-to-Plane Correspondences: Existence Condition and Closed-Form Solutions," Proc. 3rd. Int. Coni. Comp. Vision, Dec. 4-7, 1990, pp. 374-378.

Erdogan et al., "Planar Segmentation of RGBD Images Using Fast Linear Filling and Markov Chain Monte Carlo," Proceedings of the IEEE International Conference on Computer and Robot Vision, May 27-30, 2012, pp. 32-39.

Guo et al., "IMU-RGBD Camera 3d Pose Estimation and Extrinsic Calibration: Observability Analysis and Consistency Improvement," Proceedings of the IEEE International Conference on Robotics and Automation. May 6-10, 2013, pp. 2935-2942.

Guo et al., "Observability-constrained EKF Implementation of the IMU-RGBD Camera Navigation Using Point and Plane Features," Technical Report, University of Minnesota, Mar. 2013, 6 pp.

Hermann et al., "Nonlinear Controllability and Observability," IEEE Trans. On Automatic Control, vol. 22(5), Oct. 1977, pp. 728-740.

Herrera et al., "Joint Depth and Color Camera Calibration with Distortion Correction," IEEE Trans. On Pattern Analysis and Machine Intelligence, vol. 34(10), Oct. 2012, pp. 2058-2064.

Hesch et al., "Observablity-constrained vision-aided Inertial Navigation," University of Minnesota, Department of Computer Science and Engineering, MARS Lab, Feb. 2012, 24 pp.

Hesch et al., "Towards Consistent Vision-aided Inertial Navigation," Proceedings of the 10th International Workshop on the Algorithmic Foundations of Robotics, Jun. 13-15, 2012, 16 pp.

Huang et al., "Visual Odometry and Mapping for Autonomous Flight Using an RGB-D Camera," Proceedings of the International Symposium on Robotics Research, Aug. 28 through Sep. 1, 2011, 16 pp.

Jones et al., "Visual-inertial Navigation, Mapping and Localization: A Scalable Real-time Causal Approach," Int. J. Robot. Res., vol. 30(4), Apr. 2011, pp. 407-430.

Kottas et al., "On the Consistency of Vision-aided Inertial Navigation," Proceedings of the Int. Symp. Exper. Robot., Jun. 17-21, 2012, 15 pp.

Li et al., "Improving the Accuracy of EKF-based Visual-inertial Odometry," Proceedings of the IEEE International Conference on Robotics and Automation, May 14-18, 2012, pp. 828-835.

Liu et al., "Estimation of Rigid Body Motion Using Straight Line Correspondences," Computer Vision, Graphics, and Image Processing, vol. 43(1 ), Jul. 1988, pp. 37-52.

Lupton et al., "Visual-inertial-aided Navigation for High-dynamic Motion in Buill Environments Without Initial Conditions," IEEE Trans. Robot., vol. 28(1), Feb. 2012, pp. 61-76.

Martinelli, "Vision and IMU Data Fusion: Closed-form Solutions for Attitude, Speed, Absolute Scale, and Bias Determination," IEEE Trans. Robot, vol. 28(1), Feb. 2012, pp. 44-60.

(56) References Cited

OTHER PUBLICATIONS

Matas et al., "Robust Detection of Lines Using the Progressive Probabilistic Hough Transformation," Computer Vision and Image Understanding, vol. 78(1 ), Apr. 2000, pp. 119-137.
Meltzer et al., "Edge Descriptors for Robust Wide-baseline Correspondence," Proc. IEEE Conf. Comp. Vision Pall. Recog., Jun. 23-28, 2008, pp. 1-8.
Mirzaei et al., "Optimal Estimation of Vanishing Points in a Manhattan World," IEEE Int. Conf. Comp. vision, Nov. 6-13, 2011, pp. 2454-2461.
Mirzaei et al., "Globally Optimal Pose Estimation from Line Correspondences," Proc. IEEE Int. Coni. Robot., May 9-13, 2011, pp. 5581-5588.
Mourikis et al., "A Multi-state Constraint Kalman Filter for Vision-aided Inertial Navigation," Proceedings of the IEEE International Conference on Robotics and Automation, Apr. 10-14, 2007, pp. 3565-3572.
Roumeliotis et al., "Stochastic Cloning: A Generalized Framework for Processing Relative State Measurements," Proc. IEEE Int. Conf. Robot. Autom., May 11-15, 2002, pp. 1788-1795.
Schmid et al., "Automatic Line Matching Across Views," Proc. of the IEEE Conf. on Computer Vision and Pattern Recognition, Jun. 1997, pp. 666-671.
Servant et al., "Improving Monocular Plane-based SLAM with Inertial Measurements," Proceedings of the IEEE/RSJ International Conference on Intelligent Robots and Systems, Oct. 18-22, 2010, pp. 3810-3815.
Smith et al., "Real-time Monocular Slam with Straight Lines," British Machine vision Conference, vol. 1, Sep. 2006, pp. 17-26.
Spetsakis et al., "Structure from Motion Using Line Correspondences," Int. Journal Computer Vision, vol. 4(3), Jun. 1990, pp. 171-183.
Taylor et al., "Structure and Motion from Line Segments in Multiple Images," IEEE Trans. Pall. Analy. Machine Intell., vol. 17(11), Nov. 1995, pp. 1021-1032.
Trawny et al., "Indirect Kalman Filter for 3D Attitude Estimation," University of Minnesota, Dept. of Comp. Sci. & Eng., MARS Lab, Mar. 2005, 25 pp.
Weiss et al., "Real-time Metric State Estimation for Modular Vision-inertial Systems," Proceedings of the IEEE International Conference on Robotics and Automation, May 9-13, 2011, pp. 4531-4537.
Weiss et al., "Real-time Onboard Visual-inertial State Estimation and Self-calibration of MAVs in Unknown Environment," Proceedings of the IEEE International Conference on Robotics and Automation, May 14-18, 2012, pp.
Weiss et al., "Versatile Distributed Pose Estimation and sensor Self-Calibration for an Autonomous MAV," 34 Proceedings of IEEE International Conference on Robotics and Automations, May 14-18, 2012, pp. 31-38.
Weng et al., "Motion and Structure from Line Correspondences: Closed-form Solution, Uniqueness, and Optimization," IEEE Transactions on Pattern Analysis and Machine Intelligence, vol. 14(3), Mar. 1992, pp. 318-336.
Williams et al., "Feature and Pose Constrained Visual Aided Inertial Navigation for Computationally Constrained Aerial Vehicles," Proceedings of the International Conference on Robotics and Automation, May 9-13, 2011, pp. 431-438.
Zhou et al., "Determining 3d Relative Transformations for any Combiniation of Range and Bearing Measurements," IEEE Trans. On Robotics, vol. 29(2), Apr. 2013, pp. 458-474.
Dellaert et al., "Square Root SAM: Simultaneous Localization and Mapping via Square Root Information Smoothing," International Journal of Robotics and Research, vol. 25(12), Dec. 2006, pp. 1181-1203.
Eustice et al., "Exactly Sparse Delayed-state Filters for View-based SLAM," IEEE Transactions on Robotics, vol. 22 (6), Dec. 2006, pp. 1100-1114.
Johannsson et al., "Temporally Scalable Visual Slam Using a Reduced Pose Graph," in Proceedings of the IEEE International Conference on Robotics and Automation, May 6-10, 2013, 8 pp.
Kaess et al., "iSAM: Incremental Smoothing and Mapping," IEEE Transactions on Robotics, Manuscript, Sep. 2008, 14 pp.
Kaess et al., "iSAM2: Incremental Smoothing and Mapping Using the Bayes Tree," International Journal of Robotics Research, vol. 21, Feb. 2012, pp. 217-236.
Klein et al., "Parallel Tracking and Mapping for Small AR Workspaces," in Proceedings of the IEEE and ACM International Symposium on Mixed and Augmented Reality, Nov. 13-16, 2007, pp. 225-234.
Konolige et al., "Efficient Sparse Pose Adjustment for 2D Mapping," in Proceedings of the IEEE/RSJ International Conference on Intelligent Robots and Systems, Oct. 18-22, 2010, pp. 22-29.
Konolige et al., "FrameSLAM: From Bundle Adjustment to Real-time Visual Mapping," IEEE Transactions on Robotics, vol. 24(5), Oct. 2008, pp. 1066-1077.
Konolige et al., "View-based Maps," International Journal of Robotics Research, vol. 29(29), Jul. 2010, pp. 941-957.
Kummerle et al., "g2o: A General Framework for Graph Optimization," in Proceedings of the IEEE International Conference on Robotics and Automation, May 9-13, 2011, pp. 3607-3613.
Mourikis et al., "Vision-Aided Inertial Navigation for Spacecraft Entry, Descent, and Landing," IEEE Transactions on Robotics, vol. 25(2), Apr. 2009, pp. 264-280.
Sibley et al., "Sliding Window Filter with Application to Planetary Landing," Journal of Field Robotics, vol. 27(5), Sep./Oct. 2010, pp. 587-608.
Smith et al., "On the Representation and Estimation of Spatial Uncertainty," International Journal of Robotics Research, vol. 5(4), 1986, pp. 56-68 (Note: Applicant points out in accordance with MPEP 609.04(a) that the 1986 year of publication is sufficiently earlier than the effective U.S. filed and any foreign priority date of May 7, 2014 so that the particular month of publication is not in issue.).
Mirzaei et al., "A Kalman Filter-based Algorithm for IMU-camera Calibration: Observability Analysis and performance Evaluation," IEEE Trasactions on Robotics, vol. 24(5), Oct. 2008, pp. 1143-1156.
U.S. Appl. No. 61/767,701, by Stergios I. Roumeliotis, filed Feb. 21, 2013.
U.S. Appl. No. 62/023,569 by Stergios I. Roumeliotis, filed Jul. 11, 2014.
U.S. Appl. No. 62/014,532 by Stergios I. Roumeliotis, filed Jun. 19, 2014.

\* cited by examiner

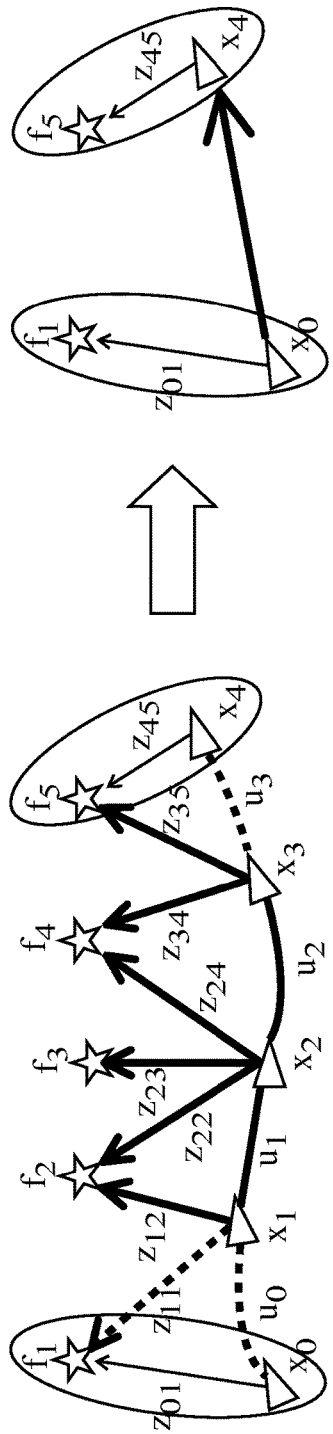

CONSTRAINED KEY FRAME LOCALIZATION AND MAPPING FOR VISION-AIDED INERTIAL NAVIGATION

This application claims the benefit of U.S. Provisional Application No. 61/821,136, filed May 8, 2013, the entire content on which is incorporated herein by reference.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six-degrees-of-freedom (d.o.f.) position and orientation (pose) of a sensing platform. In this way, the VINS combines complementary sensing capabilities. For example, an IMU can accurately track dynamic motions over short time durations, while visual data can be used to estimate the pose displacement (up to scale) between consecutive views. For several reasons, VINS has gained popularity within the robotics community as a method to address GPS-denied navigation.

SUMMARY

In general, this disclosure describes various techniques for use within a vision-aided inertial navigation system (VINS). More specifically, constrained keyframe localization and mapping (C-KLAM) techniques are described. In one example, a maximum a posteriori (MAP) estimator-based keyframe approach for simultaneous localization and mapping (SLAM) is described. As opposed to many existing keyframe-based SLAM approaches, that discard information from non-keyframes in order to reduce the computational complexity, the proposed C-KLAM presents a novel and computationally-efficient technique for incorporating at least a portion (e.g., most) of this information, resulting in improved estimation accuracy.

In one example implementation, an approximate MAP estimator-based SLAM algorithm, referred to as C-KLAM, is described. In order to reduce the computational complexity of a batch MAP-based SLAM, an estimator within a VINS applies C-KLAM to compute state estimates along a trajectory only for the keyframes and key landmarks, observed from these keyframes. However, instead of discarding the measurement information from non-keyframes and non-key landmarks, C-KLAM uses most of this information to generate consistent pose constraints between the keyframes, resulting in substantial information gain. Moreover, the approximations performed in C-KLAM retain the sparsity of the information matrix, and hence the resulting optimization problem can be solved efficiently.

In this way, the C-KLAM techniques project information from the non-keyframes to the keyframes, using marginalization, while maintaining the sparse structure of the information matrix, to generate fast and efficient solutions. In one example, the C-KLAM techniques project both proprioceptive and exteroceptive information from the non-keyframes to the keyframes, using marginalization, while maintaining the sparse structure of the associated information matrix, resulting in fast and efficient solutions.

The performance of C-KLAM has been tested in both simulations and experimentally, using visual and inertial measurements, to demonstrate that it achieves performance comparable to that of the computationally-intensive batch MAP-based 3D SLAM that uses all available measurement information. The results demonstrated that C-KLAM not only obtains substantial speed-up, but also achieves estimation accuracy comparable to that of the batch MAP-based SLAM that uses all available measurement information.

In one example, a vision-aided inertial navigation system comprises an image source to produce image data for a first keyframe, one or more non-keyframes and a second keyframe along a trajectory of the vision-aided inertial navigation system (VINS). The one or more non-keyframes are located between the first keyframe and second keyframe along the trajectory. The VINS comprises an inertial measurement unit (IMU) to produce IMU data indicative of a motion of the VINS along the trajectory for the keyframe and the one or more non-keyframes. A processing unit of the VINS comprises an estimator that processes the IMU data and the image data to compute respective state estimates for a position and orientation of the VINS for the first keyframe and for the second keyframe. When computing the state estimates, the estimator constrains the state estimates for the second keyframe relative to the state estimates for the first keyframe based on the IMU data and the image data from the one or more non-keyframes. In one example, when constraining the state estimates, the estimator treats a landmark observed within the image data for the first keyframe and the second keyframe as different from the same landmark observed within the image data for the non-keyframes.

A method for computing state estimates for a vision-aided inertial navigation system (VINS) comprises receiving image data produced by an image source of the vision-aided inertial navigation system for a first keyframe, one or more non-keyframes and a second keyframe along a trajectory of the vision-aided inertial navigation system (VINS), the one or more non-keyframes located between the first keyframe and second keyframe along the trajectory, and receiving, from an inertial measurement unit (IMU), IMU data indicative of motion of the VINS along the trajectory for the keyframe and the one or more non-keyframes. The method further comprises processing the IMU data and the image data to compute state estimates of the VINS for the keyframe by constraining the state estimates based on the IMU data and the image data of the one or more non-keyframes of the VINS without computing state estimates for the position and the orientation of the VINS for the one or more non-keyframes. In example embodiments, constraining the state estimates comprises treating a landmark observed within the image data for the first keyframe and the second keyframe as different from the same landmark observed within the image data for the non-keyframes.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a logical diagram illustrating an example of the exploration epoch before (left) and after (right) the approximation employed in C-KLAM.

FIG. 5 illustrates a structure of the Hessian matrices, $H_{c_1}$ and $H_{c_2}$ corresponding to cost functions $c_1$ and $c_2$.

DETAILED DESCRIPTION

Figure 1:
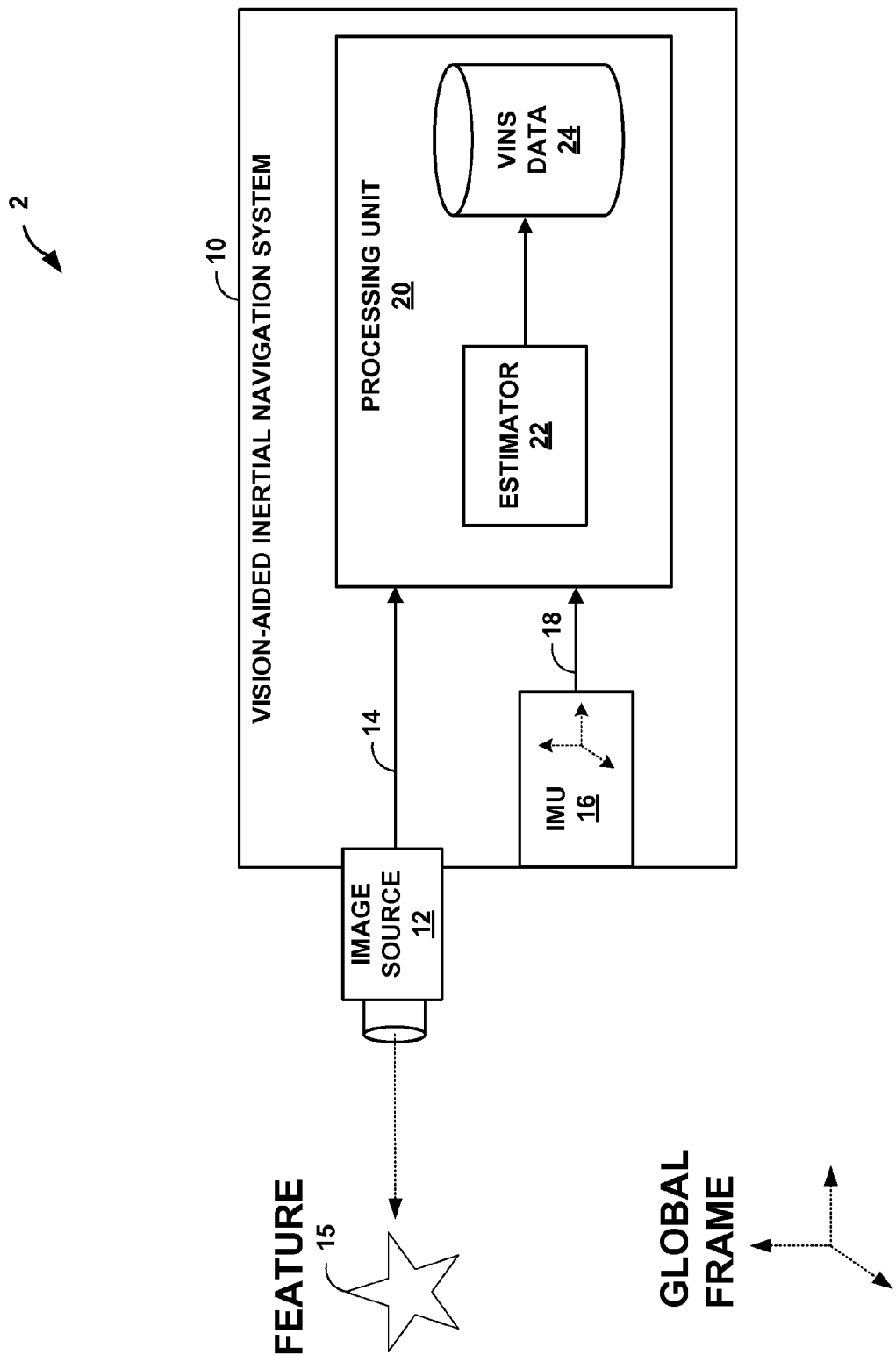
FIG. 1 is a block diagram illustrating a sensor platform comprising an IMU and a camera.

One of the main challenges in designing an estimation algorithm for mobile devices (e.g., mobile computing devices, mobile phones, robots and the like) navigating in large environments over long time periods using Vision-aided Inertial Navigation System (VINS) is the inherent high computational complexity. For example, the computational complexity of the Minimum Mean Squared Error (MMSE) estimator for Simultaneous Localization and Mapping (SLAM), i.e., the Extended Kalman filter, often used in VINS is $O(N^2)$ at each time step, where N is the number of landmarks in the map. Similarly, for the batch Maximum A Posteriori (MAP) estimator-based SLAM (smoothing and mapping), the worst-case computational complexity is $O([K+V]^3)$, where K is the number of poses for the mobile device in the trajectory. While existing batch MAP-based SLAM approaches such as the $\sqrt{SAM}$, $g^2o$, and SPA seek to generate solutions by exploiting the sparsity of the information matrix, for large-scale SLAM with frequent loop closures, this cost eventually prohibits real-time operation.

This disclosure presents MAP-based Constrained Keyframe Localization and Mapping (C-KLAM) techniques, which compute state estimate of the VINS for keyframes along with the positions of landmarks observed from these keyframes.

That is, the C-KLAM techniques provide an approximate batch MAP-based algorithm that estimates only keyframes (key robot device poses) and key landmarks while also exploiting information (e.g., visual observations and odometry measurements) available to the non-keyframes. In particular, this information is projected onto the keyframes, by generating consistent pose (position and orientation) constraints between them.

As used herein, the term keyframes refers to the individual poses of the VINS for which position and orientation of the VINS are to be estimated. In contrast, the term non-keyframes refers to intermediate poses between keyframes and for which complete state estimates of the VINS are not computed. In example implementations described herein, information from non-keyframes, acquired between keyframes, is not discarded. Instead, this information is projected on to the keyframes, in order to generate tight constraints between the keyframes. For example, information from a non-keyframe may be projected onto a preceding keyframe to compute relative position and orientation constraints between the preceding keyframe and the non-keyframe.

Aspects of the disclosure may have certain advantages. For example, in contrast to existing keyframe-based estimation methods, the C-KLAM techniques described herein may utilize all available measurement information, both proprioceptive (e.g., IMU) and exteroceptive (e.g. camera), from non-keyframes to generate tight constraints between the keyframes. This may be achieved by marginalizing the non-keyframes along with the landmarks observed from the non-keyframes. As another example, the C-KLAM techniques described herein incorporate information from marginalized frames and landmarks without destroying the sparsity of the information matrix, and hence may be used to generate fast and efficient solutions.

In addition, a cost marginalization of the C-KLAM techniques described herein may be cubic only in the number of non-keyframes between consecutive keyframes and linear in the number of landmarks observed exclusively from the non-keyframes.

Further, the keyframes and the associated landmark-map may be maintained over the entire trajectory of a mobile device robot. As such, the C-KLAM techniques described herein may enable efficient loop closures, which may be necessary for ensuring accurate and consistent long-term navigation.

FIG. 1 is a block diagram illustrating a vision-aided inertial navigation system (VINS) 10 comprising at least one image source 12 and an inertial measurement unit (IMU) 14. VINS 10 may be a standalone device or may be integrated within or coupled to a mobile device, such as a robot, a mobile computing device such as a mobile phone, tablet, laptop computer or the like.

Image source 12 images an environment in which VINS 10 operates so as to produce image data 14. That is, image source 12 provides image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system having multiple cameras to produce 3D information, and the like. For example, image source 12 may produce image data for a first keyframe, one or more non-keyframes and a second keyframe along a trajectory of VINS 10. The one or more non-keyframes being located between the first keyframe and second keyframe along the trajectory. In this way, image data 14 provides exteroceptive information as to the external environment in which VINS 10 operates.

IMU 16 produces IMU data 18 indicative of a dynamic motion of VINS 10. IMU 14 may, for example, detect a current rate of acceleration using one or more accelerometers as VINS 10 is translated, and detect changes in rotational attributes like pitch, roll and yaw using one or more gyroscopes. IMU 14 produces IMU data 18 to specify the detected motion. In this way, IMU data 18 provides proprioceptive information as to the VINS 10 own perception of its movement and orientation within the environment.

Estimator 22 of processing unit 20 process image data 14 and IMU data 18 to compute state estimates for the degrees of freedom of VINS 10 and, from the state estimates, computes position, orientation, speed, locations of observable features, a localized map, an odometry or other higher order derivative information represented by VINS data 24.

In one example, estimator 22 comprises an EKF that estimates the 3D IMU pose and linear velocity together with the time-varying IMU biases and a map of visual features 15. Estimator 22 may, in accordance with the techniques described herein, apply estimation techniques (referred to as C-KLAM techniques) that computes state estimates by projecting IMU data and image data from non-keyframes to keyframes. That is, estimator 22 computes the state estimates for position and orientation of the VINS for the keyframes by constraining the state estimates for the each the keyframes relative to a prior keyframe based on the IMU data 18 and the image data 14 acquired for one or more preceding non-keyframes between the keyframes by marginalizing the non-keyframes. In this way, the described estimator applies a computationally-efficient technique for incorporating at least a portion of the information from non-keyframes, resulting in improved estimation accuracy.

For example, estimator 22 processes IMU data and the image data associated with the non-keyframes to compute one or more position and orientation constraints from a first keyframe to a second keyframe for the VINS, where the first and second keyframes may be any pair of keyframes along the trajectory of the VINS. That is, estimator 22 may process the IMU data 18 and the image data 14 associated with the non-keyframes to compute constraints to changes in position and orientation from the first keyframe to the second keyframe for the VINS. The estimator may compute each of the constraints as (i) an estimate of the motion from the first keyframe to the second keyframe (i.e., how much VINS 10 has moved and/or rotated between the two keyframes), and (ii) a covariance (or information matrix) providing an indication of an uncertainty of the estimated motion.

Moreover, in one example implementation, when computing the constraints between keyframes for the state estimates, estimator 22 may treat a feature observed within the image data for one or more of the keyframes as different from that same feature observed within the image data for the non-keyframes. In other words, for purposes of computing the state estimates for keyframes, estimator 22 may disregard dependencies for each of the landmarks with respect to landmarks observed within the image data for the one or more non-keyframes. In this way, estimator 22 may constrain the state estimates for keyframes by marginalizing the non-keyframes and non-key features from the estimate calculation computation.

In another example embodiment, estimator 22 may also, or alternatively, treat the same keyframe as being two or more different keyframes. In other words for the purpose of computing the estimates of the keyframes, estimator 22 may disregard the fact that a keyframe is the same in each of the constraints in which it is involved and treat the same keyframe appearing in multiple constraints as being different keyframes. These constraints can correspond to constraints due to observations of landmarks, or constraints due to motion as measured from the IMU, or constraints induced by marginalizing non-keyframes and non-key features.

Furthermore, in one example, when computing state estimates, estimator 22 may prevent projection of the image data and IMU data from both the key-frames and the non-keyframes along at least one unobservable degree of freedom. As one example, a rotation of the sensing system around a gravity vector may be undetectable from the input of a camera of the sensing system when feature rotation is coincident with the rotation of the sensing system. Similarly, translation of the sensing system may be undetectable when observed features are identically translated. By preventing projection of image data 14 and IMU data 18 for both keyframes and non-keyframes along at least one unobservable degree of freedom, the techniques may improve consistency and reduce estimation errors as compared to conventional VINS.

Example details of an estimator 22 for a vision-aided inertial navigation system (VINS) in which the estimator enforces the unobservable directions of the system, hence preventing spurious information gain and reducing inconsistency, can be found in U.S. patent application Ser. No. 14/186,597, entitled "OBSERVABILITY-CONSTRAINED VISION-AIDED INERTIAL NAVIGATION," filed Feb. 21, 2014, and U.S. Provisional Patent Application Ser. No. 61/767,701, filed Feb. 21, 2013, the entire content of each being incorporated herein by reference.

Example Algorithm Description—Batch Least Squares Formulation

Figures 2, 3:
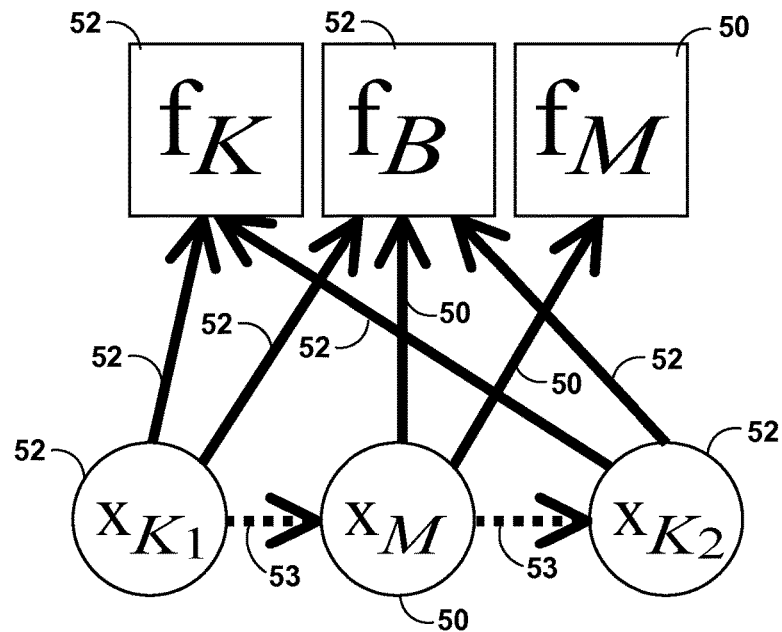
FIG. 2 is a block diagram illustrating an example current exploration epoch.
FIG. 3 illustrates a structure of the sparse information matrix $A_m$ corresponding to a cost function $c_2$.

For purposes of explanation, batch MAP-based estimator for SLAM is first explained, where the objective is to compute estimates for VINS 10 from time-step 0 up to the current time-step k and estimates for all the observed landmarks. To facilitate the description of SLAM estimation algorithms, the specific example scenario depicted in FIG. 2 is used. Note, however, that C-KLAM described herein is a general approach that can be used for any number of key and non-key poses and landmarks.

Consider a robot or other mobile device containing VINS 10, equipped with proprioceptive (e.g., IMU) and exteroceptive (e.g., camera) sensors, navigating in a 3D environment. The state vector can be represented given by:

$$x_{0:k}^{BA} = [X_0^T X_1^T \ldots X_k^T f_1^T \ldots f_m^T]^T \quad (1)$$

where $x_i$ denotes the robot pose (position and orientation) at time-step i, i=0, 1, 2, ..., k, and $f_j$ is the position of the j-th landmark, j=1, 2, ..., m, with respect to a global frame of reference.

The motion model for a robot or other mobile device containing VINS 10 between time-steps i−1 and i is described by the following generic nonlinear equation:

$$g_i = x_i - f(x_{i-1}, u_{i-1_m} - w_{i-1}) = 0 \quad (2)$$

where the true control input is $u_{i-1} = u_{i-1_m} - w_{i-1}$, $u_{i-1_m}$ denotes the measured control input, and $w_{i-1}$ is the zero-mean, white Gaussian measurement noise with covariance $Q_{i-1}$. To employ a batch-MAP estimator, (2) is linearized and the Jacobians are computed with respect to the state vector (1) and the noise, respectively, i.e., $$\Phi_{i-1} \triangleq \frac{\partial g_i}{\partial x_{0:k}^{BA}}\bigg|_{\{\hat{x}_{0:k}^{BA}, 0\}} = [0_{|X| \times |X|} \ldots \phi_{x_{i-1}} \; I_{|X|} \ldots 0_{|X| \times 3} \ldots 0_{|X| \times 3}] \quad (3)$$

$$G_{i-1} \triangleq \frac{\partial g_i}{\partial w_{i-1}}\bigg|_{\{\hat{x}_{0:k}^{BA}, 0\}} \quad (4)$$

where |x| is the dimension of the state of a single robot pose, $\hat{x}_{0:k}^{BA}$ denotes the linearization point for the state (1) which is the current best estimate, while a zero vector is used as the linearization point for the noise, and $\Phi_{x_{j-1}}$ denotes the Jacobian with respect to the robot pose at time step i−1.

In one example, a robot or other mobile device containing VINS 10 is equipped with an exteroceptive image source 12, e.g., a camera, and observes landmarks (e.g., feature 15 of FIG. 1) in the environment. The measurement model for robot pose i observing landmark j is given by the following general nonlinear function:

$$z_{ij} = h(x_i, f_j) + v_{ij} \quad (5)$$

where $z_{ij}$ denotes the measurement, and $v_{ij}$ is zero-mean Gaussian measurement noise with covariance $R_{ij}$. And the measurement Jacobian matrix is given by:

$$H_{ij} \triangleq \frac{\partial h}{\partial x_{0:k}^{BA}}\bigg|_{\{x_{0:k}^{BA}\}} = \qquad (6)$$

$$[\, 0_{|z|\times|X|} \;\ldots\; H_{x_{ij}} \; 0_{|z|\times|X|} \;\ldots\; H_{f_{ij}} \; 0_{|z|\times 3} \;\ldots\; 0_{|z|\times 3} \,]$$

where $|z|$ is the dimension of a single exteroceptive sensor measurement, and $H_{x_{ij}}$ and $H_{f_{ij}}$ are the Jacobians with respect to the robot pose at time-step i and the j-th landmark position, respectively.

In one example implementation, the batch-MAP estimator utilizes all the available information to estimate the state vector (1). The information used may include: (i) the prior information about the initial state, described by a Gaussian pdf with mean $\hat{x}_{0|0}$ and covariance $P_{0|0}$, (ii) the proprioceptive sensor motion information (5), and (iii) the exteroceptive sensor measurements (2). In this example, the batch-MAP estimator seeks to determine the estimate $\hat{x}_{0:k|k}^{BA}$ that maximizes the posterior pdf:

$$p(x_{0:k}^{BA} \mid \mathcal{Z}_{0:k}) \propto p(x_0) \prod_{i=1}^{k} p(x_i \mid x_{i-1}, u_{i-1_m}) \prod_{z_{ij} \in Z_{0:k}} p(z_{ij} \mid x_i, f_j) \qquad (7)$$

where $Z_{0:k}$ denotes all the available measurements in the time interval [0,k]. For Gaussian and independent measurement noises (see (2), and (2), respectively), this pdf (7) can be written as:

$$p(x_{0:k}^{BA} \mid \mathcal{Z}_{0:k}) \propto \frac{1}{\sqrt{(2\pi)^{|x|}|P_{0|0}|}} \exp\left(-\frac{1}{2}\|x_0 \triangleq x_{0|0}\|_{P_{0|0}}^2\right) \times \qquad (8)$$

$$\prod_{i=1}^{k} \frac{1}{\sqrt{(2\pi)^{|x|}|Q'_{i-1}|}} \exp\left(-\frac{1}{2}\|x_i - f(x_{i-1}, u_{i-1_m})\|_{Q'_{i-1}}^2\right) \times$$

$$\prod_{z_{ij} \in Z_{0:k}} \frac{1}{\sqrt{(2\pi)^{|z|}|R_{ij}|}} \exp\left(-\frac{1}{2}\|z_{ij} - h(x_i, f_j)\|_{R_{ij}}^2\right)$$

In the above expression, the notations $\|a\|_M^2 \triangleq a^T M^{-1} a$ and $Q'_{i-1} \triangleq G_{i-1} Q_{i-1} G_{i-1}^T$ are utilized. By taking logarithm and ignore constant terms, the maximization of (8) is equivalent to the minimization of the following cost function:

$$c(x_{0:k}^{BA}) = \frac{1}{2}\|x_0 \triangleq x_{0|0}\|_{P_{0|0}}^2 + \qquad (9)$$

$$\sum_{i=1}^{k} \frac{1}{2}\|x_i - f(x_{i-1}, u_{i-1_m})\|_{Q'_{i-1}}^2 + \sum_{z_{ij} \in Z_{0:k}} \frac{1}{2}\|z_{ij} - h(x_i, f_j)\|_{R_{ij}}^2$$

$c(x_{0:k}^{BA})$ is a nonlinear least squares cost function, and a standard approach to determine its minimum is to employ Gauss-Newton iterative minimization. Specifically, at the l-th iteration of this method, a correction, $\delta x_{0:k}^{BA(l)}$, to the current estimate, $\hat{x}_{0:k|k}^{BA(l)}$, is computed by minimizing the second-order Taylor-series approximation of the cost function which is given by:

$$c\left(\hat{x}_{0:k|k}^{BA(l)} + \delta x_{0:k}^{BA(l)}\right) \simeq c(\hat{x}_{0:k|k}^{BA(l)}) + b_b^{(l)T} \delta x_{0:k}^{BA(l)} + \frac{1}{2} \delta x_{0:k}^{BA(l)T} A_b^{(l)} \delta x_{0:k}^{BA(l)} \qquad (10)$$

where $$b_b^{(l)} \triangleq \nabla_{x_{0:k}^{BA}} c(\cdot)\bigg|_{\{x_{0:k|k}^{BA(l)}\}} \qquad (11)$$

$$A_b^{(l)} \triangleq \nabla^2_{x_{0:k}^{BA}} c(\cdot)\bigg|_{\{x_{0:k|k}^{BA(l)}\}} \qquad (12)$$

are the gradient and Hessian of $c(\cdot)$ with respect to $x_{0:k}^{BA}$, evaluated at the current state estimate $\hat{x}_{0:k|k}^{BA(l)}$.

The structure of the Jacobian and Hessian matrices which will be used in the ensuing analysis is now examined. Specifically, at the l-th iteration, $b_b^{(l)}$ is (see (3) and (6)):

$$b_b^{(l)} = \Pi^T P_{0|0}^{-1}(\hat{x}_{0|k}^{(l)} - \hat{x}_{0|0}) + \Sigma_{i=1}^{k} \Phi_{i-1}^{(l)T} Q'_{i-1}^{-1}$$
$$(\hat{x}_{i|k}^{(l)} - f(\hat{x}_{i-1|k}^{(l)}, u_{i-1_m})) - \Sigma_{z_{ij} \in Z_{0:k}} H_{ij}^{(l)T} R_{ij}^{-1}$$
$$(z_{ij} - h(f_{j|k}^{(l)})) \qquad (13)$$

where $\Pi = [I_{|x|} \ldots 0]$. On the other hand, the Hessian matrix, $A_b^{(l)}$, is approximated in the Gauss-Newton method by (see (3) and (6)):

$$A_b^{(l)} = \Pi^T P_{0|0}^{-1} \Pi + \Sigma_{i=1}^{k} \Phi_{i-1}^{(l)T} Q'_{i-1}^{-1} + \Sigma_{z_{ij} \in Z_{0:k}} H_{ij}^{(l)T}$$
$$R_{ij}^{-1} H_{ij}^{(l)} \qquad (14)$$

which is a good approximation for small-residual problems. Due to the sparse structure of the matrices $H_{ij}^{(l)}$ and $\Phi_i^{(l)}$ (see (3) and (6)), the matrix $A_b^{(l)}$ is also sparse, which can be exploited to speed-up the solution of the linear system in (15). The value of $\delta x_{0:k}^{BA(l)}$ that minimizes (10) is found by solving the following linear system:

$$A_b^{(l)} \delta x_{0:k}^{BA(l)} = -b_b^{(l)} \qquad (15)$$

Once $\delta x_{0:k}^{BA(l)}$ is found, the new state estimate is updated as:

$$\hat{x}_{0:k|k}^{BA(l+1)} = \hat{x}_{0:k|k}^{BA(l)} \oplus \delta x_{0:k}^{BA(l)} \qquad (16)$$

where $\oplus$ is the corresponding update rule. Given an initial estimate $\hat{x}_{0:k|k}^{BA(0)}$ that resides within the attraction basin of the global optimum, the iterative algorithm described above will compute the global minimum (i.e., MAP estimate) for the entire state given all measurements up to time-step k along the trajectory of VINS 10.

Keyframe Based SLAM

As the mobile device continuously moves and observes new landmarks, the size of the state vector $x_{0:k}^{BA}$ in the batch MAP estimator constantly increases (typically linearly in time). This may not be suitable for all real-time operations. To reduce the computational cost of the batch MAP estimator, in one example implementation, estimator 22 of VINS 10 stores a threshold number of keyframes, and the keyframes' poses of VINS 10 along with the positions of landmarks observed from these keyframes (referred to as "key landmarks") are estimated without computing state estimates of VINS 10 for non-keyframes or computing positions for landmarks observed only from non-keyframes (referred to as "non-key landmarks"). Information from non-keyframes, however, is not discarded. Instead, this information is retained through marginalization. A marginalization approach with respect to the non-keyframes and non-key landmarks, and C-KLAM-based estimation techniques, are described.

FIG. 2 is a block diagram illustrating the structure of an example current exploration epoch. In FIG. 2, $x_M$ denotes the non-key poses between the two sets, $x_{K_1}$ and $x_{K_2}$, of key poses along a trajectory. $f_K$, $f_M$, and $f_B$ denote the landmarks observed only from the key poses, only from the non-key poses, and both from the key and non-key poses, respectively. The arrows denote the measurements between different states.

Consider the current exploration epoch shown in FIG. 2. Here, estimator 22 keeps in its internal state vector the keyframe poses $\{x_{K_1}, x_{K_2}\}$ and key landmarks $\{f_K, f_B\}$ observed from these keyframes, while marginalizing out non-keyframe poses $\{x_M\}$ and non-key landmarks $\{f_M\}$ observed exclusively from the non-keyframe poses. As such, the state vector (1) may be partitioned into:

$$x_{0:k}^{BA} = [x_R^{CK^T} \; x_M^{CK^T}]^T = x^{CK} \quad (17)$$

where $x_R^{ck} = [X_{K_1}{}^t X_{K_2}{}^T f_K{}^T f_B{}^T]^T$ denote the states that will be retained, while $x_M^{ck} = [x_M{}^T f_M{}^T]^T$ are that states to be marginalized.

The following notations are used: let $x_{K_{12}}$ denote the last pose in $x_{K_1}$ and the first pose in $x_{K_2}$. Let $u_{K_1}, u_{K_2}, u_M$ denote the proprioceptive measurements within poses $x_{K_1}, x_{K_2}, x_M$, respectively. And let $u_{K_1,M}, u_{M,K_2}$ (dotted arrows 53 in FIG. 2) denote the proprioceptive measurements that relate the last pose in $x_{K_1}$ with the first in $x_M$, and the last pose in $x_M$ with the first in $x_{K_2}$, respectively. Thus, the batch MAP cost function (9) associated with the current exploration epoch is given by:

$$c(x^{CK}) = c_1(x_R^{CK}) + c_2(x_R^{CK}, x_M^{CK}) = \quad (18)$$
$$c_1(x_{K_1}, x_{K_2}, f_K, f_B; z_{K_1K}, z_{K_1B}, z_{K_2K}, z_{K_2B}, u_{K_1}, u_{K_2}) +$$
$$c_2(x_M, x_{K_{12}}, f_B, f_M; z_{MB}, z_{MM}, u_{K_1,M}, u_{M,K_2}, u_M)$$

where the cost function has been decomposed into two parts: $c_2$ is the part of the cost function corresponding to measurements that involve the non-key poses $x_M$ and landmarks $f_M$ (denoted measurements 50, 53 in FIG. 2), while $c_1$ corresponds to measurements that do not involve $x_M$ and $f_M$ (depicted in measurements 52 in FIG. 2). Note that here $c_2$ is a function of $x_{R_2}{}^{CK}$ and $x_M{}^{CK}$, with $x_{R_2}{}^{CK} = x_{R_2}{}^{CK}$ and $x_M{}^{CK}$, with $x_{R_2}{}^{CK} = [x_{K_{12}}{}^T f_B{}^T]^T$ (see (18)). Thus, we have:

$$\min_{x_R^{CK}, x_M^{CK}} c(x_R^{CK}, x_M^{CK}) = \quad (19)$$
$$\min_{x_R^{CK}} \left( \min_{\{x_M^{CK}\}} c(x_R^{CK}, x_M^{CK}) \right) \min_{x_R^{CK}} \left( c_1(x_R^{CK}) + \min_{x_M^{CK}} c_2(c_{R_2}^{CK}, x_M^{CK}) \right)$$

By employing the second-order Taylor-series approximation to $c_2$ and minimizing with respect to $x_M^{CK}$, we can obtain:

$$\min_{x_M^{CK}} c_2\left(x_{R_2}^{CK}, x_M^{CK}\right) \simeq \quad (20)$$
$$\alpha_p + b_p^T \begin{bmatrix} x_{K_{12}} - \hat{x}_{12_{k|k}} \\ f_B - \hat{f}_{B_{k|k}} \end{bmatrix} + \frac{1}{2} \begin{bmatrix} x_{K_{12}} - \hat{x}_{12_{k|k}} \\ f_B - \hat{f}_{B_{k|k}} \end{bmatrix}^T A_p \begin{bmatrix} x_{K_{12}} - \hat{x}_{12_{k|k}} \\ f_B - \hat{f}_{B_{k|k}} \end{bmatrix}$$

where $\alpha_p$ is a constant, and $$b_p = b_{mr} - A_{rm} A_{mm}^{-1} b_{mn} \quad (21)$$

$$A_p = A_{rr} - A_{rm} A_{mm}^{-1} A_{mr} \quad (22)$$

with $$b_m = \nabla_{\{x_{R_2}^{CK}, x_M^{CK}\}} c_2(.)\big|_{\{\hat{x}_{R_{2k|k}}^{CK}, \hat{x}_{M_{k|k}}^{CK}\}} = \begin{bmatrix} b_{mr} \\ b_{mn} \end{bmatrix} \quad (23)$$

$$A_m = \nabla^2_{\{x_{R_2}^{CK}, x_M^{CK}\}} c_2(.)\big|_{\{\hat{x}_{R_{2k|k}}^{CK}, \hat{x}_{M_{k|k}}^{CK}\}} = \begin{bmatrix} A_{rr} & A_{rm} \\ A_{mr} & A_{mm} \end{bmatrix} \quad (24)$$

being the Jacobian and Hessian matrices corresponding to $c_2$.

FIG. 3 illustrates a structure of the sparse information matrix $A_m$ corresponding to the cost function $c_2$ (constructed by measurements shown with arrows 50 in FIG. 2). The shaded blocks denote non-zero elements. The sub-matrices $A_B$, corresponding to landmarks observed from both key and non-key poses, and $A_{f_M}$, corresponding to landmarks observed only from the non-key poses, are both block diagonal. The sub-matrix $A_M$, corresponding to non-keyframes, is block tri-diagonal.

According to the problem setup (see FIG. 2), the general structure of the Hessian $A_m$ corresponding to the cost function $c_2$, is shown in FIG. 3. Using the block notations in FIG. 3 for $A_m$, substitute into (21) and (22) obtains:

$$b_p = b_{mr} - \begin{bmatrix} B_K D^{-1} & B_K D_2 \\ B_B D^{-1} & B_B D_2 \end{bmatrix} b_{mn} = \begin{bmatrix} b_{pK} \\ b_{pB} \end{bmatrix} \quad (25)$$

$$A_p = \begin{bmatrix} A_K - B_K D^{-1} B_K^T & -B_K D^{-1} B_B^T \\ -B_B D^{-1} B_K^T & A_B - B_B D^{-1} B_B^T \end{bmatrix} = \begin{bmatrix} A_{pKK} & A_{pKB} \\ A_{pBK} & A_{pBB} \end{bmatrix} \quad (26)$$

where $$D = A_M - A_{Mf_M} A_{f_M}^{-1} A_{f_{MM}} \quad (27)$$

$$D_2 = -D^{-1} A_{Mf_M} A_{f_M}^{-1} \quad (28)$$

Constrained Keyframe Localization and Mapping (C-KLAM)

The marginalization approach, presented in the previous section, projects the information from non-keyframe poses and associated landmark observations onto both keyframe poses $x_{K_{12}}$ and key landmarks $f_B$. According to (26), the Hessian $A_p$ after this marginalization process would be dense in general, despite the fact that the $A_B$ block corresponding to the key features $f_B$ is originally sparse (block diagonal). In some cases, this approach may increase the computational complexity dramatically when the number of key features $f_B$ becomes large, and hence prove non-useful for real-time solutions. To address this problem, a second marginalization step may be used in order to project the information only onto keyframe poses $x_{K_{12}}$, but not the key landmarks $f_B$. Thus, in this example implementation, the C-KLAM techniques use information from the discarded measurements to generate constraints only between consecutive key poses, $x_{K_{12}}$, while maintaining the sparsity of the information matrix. In what follows, one example C-KLAM algorithm is described in detail.

Starting from (20), the following approximation can be introduced:

$$\min_{x_M^{CK}} c_2\left(x_{R_2}^{CK}, x_M^{CK}\right) = \min_{x_M^{CK}} c_2(x_{K_{12}}, f_B, x_M^{CK}) \simeq \quad (29)$$

$$\min_{f_B} \left( \min_{\{x_M^{CK}\}} c_2(x_{K_{12}}, f_B, x_M^{CK}) \right) \simeq \min_{f_B} \left( \alpha_p + b_p^T \begin{bmatrix} x_{K_{12}} - \hat{x}_{K_{12k|k}} \\ f_B - \hat{f}_{B_{K|K}} \end{bmatrix} + \right.$$

$$\left. \frac{1}{2} \begin{bmatrix} x_{K_{12}} - \hat{x}_{K_{12k|k}} \\ f_B - \hat{f}_{B_{k|k}} \end{bmatrix}^T A_p \begin{bmatrix} x_{K_{12}} - \hat{x}_{K_{12k|k}} \\ f_B - \hat{f}_{BK|k} \end{bmatrix} \right)$$

This is a quadratic function with respect to $f_B$ and closed form solution can be obtained easily. After solving for $f_B$ and substitute back into (29), the $c_2$ cost term can be approximated by:

$$\min_{f_B}(\min_{x_M} {}^{CK}c_2(x_{K_{12}},f_B,x_M{}^{CK}))=\alpha_d+b_d^T(x_{K_{12}}-\hat{x}_{K_{12}K|K})+\frac{1}{2}(x_{K_{12}}-\hat{x}_{K_{12}k|k})^T A_d(x_{K_{12}}-\hat{x}_{K_{12}k|k}) \quad (30)$$

with $\alpha_d$ being some constant and (see (25) and (26))

$$b_d = b_{pK} - A_{pKB} A_{pBB}^{-1} b_{pB} \quad (31)$$

$$A_d = A_{pKK} - A_{pKB} A_{pBB}^{-1} A_{pBK} \quad (32)$$

And substitute (25)-(28) into (31) and (32), by employing matrix inversion lemma, the following can be obtained:

$$b_d = b_{pk} + B_K D^{-1} B_B^T (A_B^{-1} + A_B^{-1} B_B (D - B_B^T A_B^{-1} B_B)^{-1} B_B^T A_B^{-1}) b_{pB} \quad (33)$$

$$A_d = A_K - B_K(D - B_B^T A_B^{-1} B_B)^{-1} B_K^T \quad (34)$$

Note that here both $A_B$ and $A_{f_M}$ are block diagonal and hence their inverses can be calculated with linear cost, $O(|f_B|)$ and $O(|f_M|)$, respectively. The most computationally-intensive calculation in (33) and (34) is that of $(D - B_B^T A_B^{-1} B_B)^{-1}$, which is cubic, $O(|x_M|^3)$, in the number of non-key poses currently being marginalized. Since this size is bounded, the marginalization in C-KLAM can be carried out with minimal computational overhead. Now given the marginalization equations (33) and (34), for C-KLAM, the altogether minimization problem with the total cost function combing (19) and (30) becomes:

$$x_R{}^{CK}\min(c_1(x_R{}^{CK})+b_d^T(x_{K_{12}}-\hat{x}_{K_{12}k|k})+\frac{1}{2}(x_{K_{12}}-\hat{x}_{K_{12}k|k})^T A_d (x_{K_{12}}-\hat{x}_{K_{12}k|k})) \quad (35)$$

This can be solved similarly by Gauss-Newton iterative method as in the case of batch least squares formulation. Now, the state vector contains only the keyframe poses $\{x_{K_1}, x_{K_2}\}$ and the key landmarks $\{f_K, f_B\}$. Importantly, the Hessian matrix for (35) preserves the desired sparse structure: block tri-diagonal for the poses part and block diagonal for the landmarks part. Hence C-KLAM may achieve significantly more efficient solution than the batch least squares SLAM and the standard marginalized keyframe based SLAM.

FIG. 4 is a logical diagram presenting a second example exploration epoch before (left) and after (right) estimator 22 (FIG. 1) applies C-KLAM approximation techniques described herein. In this example, $x_0$, $x_4$ are the keyframes to be retained, and $x_1$, $x_2$, and $x_3$ are the non-keyframes to be marginalized. Similarly, $f_1$, $f_5$ are key landmarks (observed from the keyframes) to be retained, while $f_2$, $f_3$, and $f_4$ are non-key landmarks (observed exclusively from the non-keyframes) to be marginalized. In the left portion of FIG. 4, the arrows denote the measurements between different states. In the right-hand portion of FIG. 4, the arrow between $x_0$, $x_4$ represents the pose constraint generated between the keyframes using C-KLAM.

Similar to the example above, the motion model for the mobile device can be given by:

$$x_{i+1} = f(x_i, u_i - w_i) \quad (1A)$$

where f is a general nonlinear function1, $x_i$ and $x_{i+1}$ denote the robot poses at time-steps i and i+1, respectively, $u_i = u_{t_i} + w_i$, is the measured control input (linear acceleration and rotational velocity), where $u_{t_i}$ denotes the true control input, and $w_i$ is the zero-mean, white Gaussian measurement noise with covariance $Q_i$. The measurement model for the mobile device at time-step i, obtaining an observation, $z_{ij}$, to landmark $f_j$ is given by:

$$z_{ij} = h(x_i, f_j) + v_{ij} \quad (2A)$$

where h is a general nonlinear measurement function[2] and $v_{ij}$ is the zero-mean, white Gaussian measurement noise with covariance $R_{ij}$.

Consider the example exploration epoch shown in FIG. 4, consisting of five robot poses, $x_i$, i=0, 1, ..., 4, and of five point landmarks, $f_j$, j=1, 2, ..., 5, observed from these poses. The batch MAP estimates, $\hat{x}_{0:4}{}^{MAP}$, $\hat{f}_{1:5}{}^{MAP}$, of all robot poses, $x_{0:4}$, and all landmark positions, $f_{1:5}$, using all available proprioceptive, $u_{0:3}$, and exteroceptive, $\mathcal{Z}_{0:4}$, measurements are given by:

$$\hat{x}_{0:4}{}^{MAP}, \hat{f}_{1:5}{}^{MAP} \triangleq \arg\max_{x_{0:4}, f_{1:5}} p(x_{0:4}, f_{1:5} | \mathcal{Z}_{0:4}, u_{0:3}) \quad (3A)$$

where $\mathcal{Z}_i$ denotes the set of all exteroceptive measurements obtained at robot pose $x_i$, i=0, 1, ..., 4. Under the Gaussian and independent noise assumptions, (3A) is equivalent to minimizing the following nonlinear least-squares cost function:

$$\mathcal{C}(x_{0:4}, f_{1:5}; \mathcal{Z}_{0:4}, u_{0:3}) = \quad (4A)$$

$$\frac{1}{2} \| x_0 - \hat{x}_{0|0} \|^2_{P_{0|0}} + \sum_{i=0}^{3} \frac{1}{2} \| x_{i+1} - f(x_i, u_i) \|^2_{Q'_i} + \sum_{z_{ij} \in \mathcal{Z}_{0:4}} \frac{1}{2} \|$$

$$z_{ij} - h(x_i, f_j) \|^2_{R_{ij}} \triangleq$$

$$\mathcal{C}_P(x_0 - \hat{x}_{0|0}) + \sum_{i=0}^{3} \mathcal{C}_M(x_{i+1}, x_i, u_i) + \sum_{z_{ij} \in \mathcal{Z}_{0:4}} \mathcal{C}_O(x_i, f_j, z_{ij})$$

where $x_0 \sim \mathcal{N}(\hat{x}_{0|0}, P_{0|0})$ denotes the prior for the robot pose, $Q'_i = G_i Q_i G_i^T$, and $G_i$ is the Jacobian of f with respect to the noise $w_i$. In what follows, the cost terms arising from the prior, the robot motion, and the landmark observations are denoted by $C_P$, $C_M$, and $C_O$, respectively.

One approach for minimizing (4A) is to employ the Gauss-Newton iterative minimization algorithm with computational complexity up to $O([K+V]^3)$, where K and N denote the number of robot poses and landmarks, respectively. Note that, as the robot explores the environment and observes new landmarks, the size of the optimization problem (both K and V) in (4A) continuously increases. Therefore, for long trajectories with many features and frequent loop closures, the cost of solving (4A) may prohibit real-time operation.

In order to reduce the computational complexity of MAP-based SLAM and ensure accurate and real-time navigation over long time durations, in accordance with the described C-KLAM techniques, estimator 22 (i) builds a sparse map of the environment consisting of only the key robot poses and the distinctive landmarks observed from these key poses, and (ii) uses measurement information from non-key poses to create constraints between the key poses, in order to improve estimation accuracy.

Specifically, for the example in FIG. 4, estimator 22 retains: (i) $x_0$ and $x_4$ as key poses, and (ii) landmarks, $f_1$ and $f_5$, observed from these key poses as key landmarks. In this case, (4A) can be split into two parts as follows:

$$\mathcal{C} = \underbrace{\mathcal{C}_P(x_0; \hat{x}_{0|0}) + \mathcal{C}_O(x_0, f_1; z_{01}) + \mathcal{C}_O(x_4, f_5; z_{45}) +}_{\mathcal{C}_1(x_0, x_4, f_1, f_5; \hat{x}_{0|0}, z_{01}, z_{45})} \quad (5A)$$

$$\underbrace{\sum_{i=0}^{3} \mathcal{C}_M(x_{i+1}, x_i, u_i) + \sum_{z_{ij} \in \mathcal{Z}_{1:3}} \mathcal{C}_O(x_i, f_j, z_{ij})}_{\mathcal{C}_2(x_{1:3}, f_{2:4}, x_0, x_4, f_1, f_5; \mathcal{Z}_{1:3}, u_{0:3})}$$

The first part of the cost function, $C_1$, depends only upon the key poses, key landmarks, and the measurements between them (denoted by thin arrows in FIG. 4). This part consists of cost terms arising from the prior term and from the two exteroceptive measurements, $z_{01}$ and $z_{45}$, obtained at the key poses $x_0$ and $x_4$, respectively. The second part of the cost function, $C_2$, contains all cost terms that involve non-key poses and non-key landmarks. Specifically, these correspond to two types of cost terms: (i) terms that involve only non-key poses and non-key landmarks (corresponding to measurements denoted by solid lines in FIG. 4), e.g., $C_O(x_1, f_2; z_{12})$, and (ii) terms that involve both key and non-key elements (corresponding to measurements denoted by dashed lines in FIG. 4), e.g., $C_O(x_1, f_1; z_{11})$ and $C_M(x_1, x_0; u_0)$.

In this example, only two key poses/landmarks are retained in order to simplify the explanation. However, estimator 22 may apply the C-KLAM techniques described herein to retain any number of key poses/landmarks. Moreover, estimator 22 may select the key poses based on certain criteria, e.g., distance traveled between two key poses, poses that observe points of interest, uniqueness of an image or other criteria. Furthermore, for the example in FIG. 4, the depth to the features is assumed to be available (e.g., from an RGB-D camera) in order to reduce the number of measurements and poses required. However, if a regular camera is used, at least two observations of a key feature and the corresponding poses may be retained.

FIG. 5 illustrates structures of the Hessian matrices, $H_{C_1}$ and $H_{C_2}$, corresponding to the cost functions $C_1$ and $C_2$ [see (5A)], respectively. The colored blocks denote non-zero elements. Specifically, for $H_{C_2}$, associated with the measurements denoted by arrows in FIG. 4, the block-diagonal sub-matrices $A_k$ and $A_b$ correspond to key poses and key landmarks, respectively. $A_r$ and $A_f$ correspond to non-key poses and non-key landmarks to be marginalized, respectively. Here $A_k$ and $A_r$ are, in general, block tri-diagonal, while $A_b$ and $A_f$ are block diagonal.

In general, some keyframe-based approaches optimize only over $C_1$ in order to reduce the computational complexity, i.e., the cost terms in $C_2$ and the corresponding measurements are discarded, resulting in significant information loss. In contrast, example implementations of the techniques described herein retain a part of the information in $C_2$ to marginalize the non-key poses and landmarks, $x_{1:3}$ and $f_{2:4}$, respectively. Mathematically, this is equivalent to approximating the cost function $C$ by $C'$ as follows (see FIG. 5):

$$C(\simeq C')(x_0, x_4, f_1, f_5; \hat{x}_{0|0}, z_{01}, z_{45}, \hat{x}_0, \hat{x}_4, \hat{f}_1, \hat{f}_5) \quad (6A)$$

$$= C_1 + C'_2(x_0, x_4, f_1, f_5; \hat{x}_0, \hat{x}_4, \hat{f}_1, \hat{f}_5)$$

where, $$C'_2 = \alpha' + g_{C'_2}^T \begin{bmatrix} x_0 - \hat{x}_0 \\ x_4 - \hat{x}_4 \\ f_1 - \hat{f}_1 \\ f_5 - \hat{f}_5 \end{bmatrix} + \frac{1}{2} \begin{bmatrix} x_0 - \hat{x}_0 \\ x_4 - \hat{x}_4 \\ f_1 - \hat{f}_1 \\ f_5 - \hat{f}_5 \end{bmatrix}^T H_{C'_2} \begin{bmatrix} x_0 - \hat{x}_0 \\ x_4 - \hat{x}_4 \\ f_1 - \hat{f}_1 \\ f_5 - \hat{f}_5 \end{bmatrix} \quad (7A)$$

with, $$H_{C'_2} = \begin{bmatrix} A_k & 0 \\ 0 & A_b \end{bmatrix} - \begin{bmatrix} B_k & 0 \\ B_b & 0 \end{bmatrix} \begin{bmatrix} A_r & A_{rf} \\ A_{fr} & A_f \end{bmatrix}^{-1} \begin{bmatrix} B_k^T & B_b^T \\ 0 & 0 \end{bmatrix} \quad (8A)$$

$$g_{C'_2} = \begin{bmatrix} g_k \\ g_b \end{bmatrix} - \begin{bmatrix} B_k & 0 \\ B_b & 0 \end{bmatrix} \begin{bmatrix} A_r & A_{rf} \\ A_{fr} & A_f \end{bmatrix}^{-1} \begin{bmatrix} g_r \\ g_f \end{bmatrix} \triangleq \begin{bmatrix} g_{C'_2,k} \\ g_{C'_2,b} \end{bmatrix}. \quad (9A)$$

Here, $\hat{x}_0$, $\hat{x}_4$, $\hat{f}_1$, and $\hat{f}_5$ are the estimates of $x_0$, $x_4$, $f_1$, and $f_5$, respectively, at the time of marginalization, $\alpha'$ is a constant term independent of the optimization variables, and $g_k, g_b, g_r$, and $g_f$ are the gradient vectors of $C_2$ with respect to $\{x_0, x_4\}$, $\{f_1, f_5\}$, $\{x_{1:3}\}$, and $\{f_{2:4}\}$, respectively. Also, $g_{C'_2}$ and $H_{C'_2}$ denote the Jacobian and Hessian matrix, respectively. Lastly, $H_{C'_2}$, as expected, is the Schur complement of the diagonal block, corresponding to non-key poses and non-key landmarks, of the Hessian, $H_{C'_2}$, of the original cost function, $C_2$ (see FIG. 5).

This marginalization of non-key elements creates additional constraints between the key poses and the key landmarks, which directly translates into fill-ins in the reduced Hessian matrix, $H_{C'_2}$. This destroys the sparse structure of the Hessian matrix $H_{C'} = H_{C_1} + H_{C'_2}$, that corresponds to the cost function $C'$ [see (6A)], and substantially increases the computational cost of obtaining a solution to the minimization problem. Due to the relationship between the measurement graph corresponding to FIG. 4 and the sparsity pattern of the resulting Hessian matrix, the exteroceptive measurements from non-key poses to key features, i.e., $z_{11}$ and $z_{35}$, are the ones responsible for generating fill-ins in the Hessian matrix, $H_{C'}$, after marginalization. Note that the proprioceptive measurements between key and non-key poses, i.e., $u_0$ and $u_3$, also generate fill-ins, but these fill-ins are desirable as they represent constraints between two consecutive key poses after marginalization.

One solution to retain the sparsity of the Hessian matrix would be to first discard any exteroceptive measurements between non-key poses and key features (e.g., $z_{11}$ and $z_{35}$ in FIG. 4), and then proceed with the marginalization of non-key elements. However, in real-world scenarios, $f_1$ and $f_5$ are not single features, but they each correspond to a group of features. Hence, such an approximation would discard numerous measurements, resulting in substantial information loss.

In order to address this problem and maintain the sparse structure of the Hessian (information) matrix while incorporating information from $C_2$, one example implementation of the C-KLAM techniques described herein carries out an additional approximation step, i.e., it further approximates $C'_2$ in (6A) by a quadratic cost term, $C''_2(x_0, x_4; \hat{x}_0, \hat{x}_4)$ that constrains only the key poses $x_0$ and $x_4$.

Figure 6:
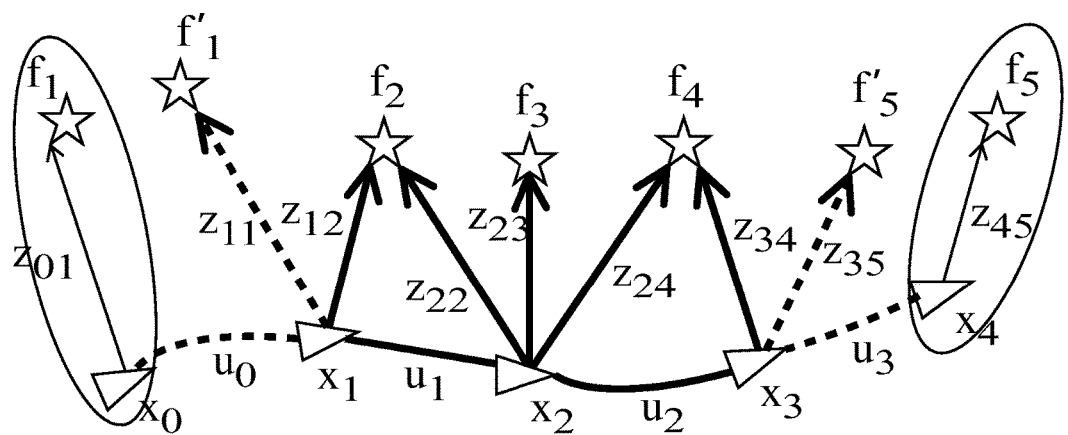
FIG. 6 is a logical diagram illustrating a Pictorial depiction of the approximation carried out by C-KLAM in order to ensure sparsity of the Hessian matrix.

Specifically, along with the non-key poses/landmarks, in this example, estimator 22 marginalizes the key landmarks $f_1$ and $f_5$, but only from $C_2$; these key landmarks will still appear as optimization variables in $C_1$ [see (5A)]. Moreover, marginalizing $f_1$ and $f_5$ from $C_2$, while retaining them in $C_1$, implies that estimator 22 ignores their data association and treat them as different features (say $f'_1$ and $f'_5$) in $C_2$. Mathematically, this process can be described by first considering the following equivalent optimization problems [see (4A), (5A), and FIG. 6]. Besides the inability to relinearize marginalized states, ignoring this data association is the main information loss incurred by C-KLAM as compared to the batch MAP-based SLAM.

$$\min C(x_{0:4}, f_{1:5}; \mathcal{Z}_{0:4}, u_{0:3}) \Leftrightarrow \min \overline{C}(x_{0:4}, f_{1:5}, f'_1, f'_5; \mathcal{Z}_{0:4}, u_{0:3}) \quad (10A)$$

s.t. $f_1 = f'_1, f_5 = f'_5$ where, $$\overline{C} = C_1\left(x_0, x_4, f_1, f_5; \hat{x}_0, z_{01}, z_{45}\right) + \quad (11A)$$

$$\overline{C}_2(x_{1:3}, f_{2:4}, x_0, x_4, f'_1, f'_5; \mathcal{Z}_{1:3}, u_{0:3})$$

Note that minimizing the batch-MAP cost function in (4A) is exactly equivalent to the constrained optimization problem presented in (10A). Now, in order to maintain the sparsity of the Hessian matrix after marginalizing the non-key elements, C-KLAM discards the constraint in (10A) and hence assumes that the features $f'_1$ and $f'_5$ are distinct from $f_1$ and $f_5$, respectively (see FIG. 6). Due to this relaxation, $\overline{C}_2$ no longer depends on the key features $f_1$ and $f_5$, and hence has no cost terms corresponding to measurements between non-key poses and key features.

Figure 7:
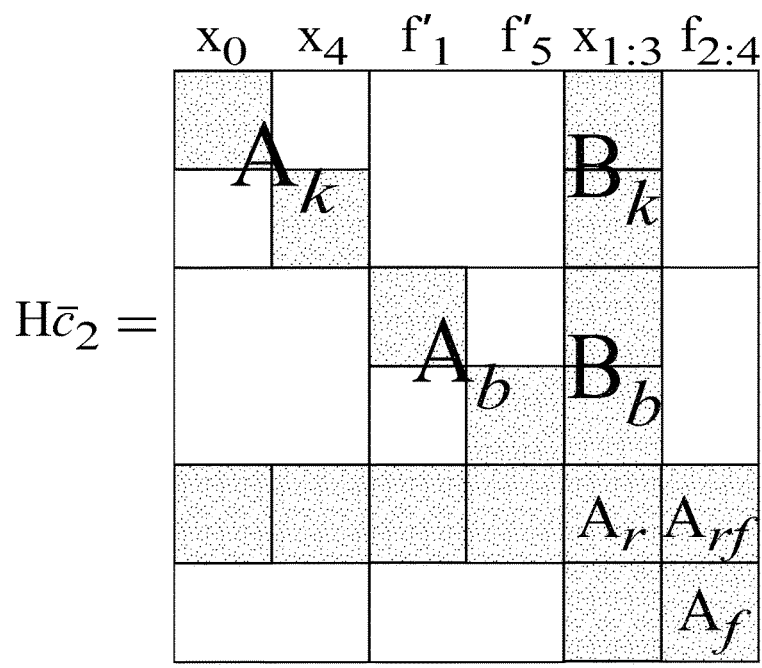
FIG. 7 illustrates a structure of the Hessian matrix $H_{\bar{c}_2}$ corresponding to cost function $\bar{c}_2$.

FIG. 7 is a logical diagram illustrating a structure of the Hessian matrix, $H_{\overline{C}_2}$, corresponding to the cost function $\overline{C}_2$ [see (A)]. The shaded blocks denote non-zero elements. Note, that this Hessian matrix does not have any entries corresponding to the key features $f_1$ and $f_5$. Instead, it has entries for the features $f'_1$ and $f'_5$. Due to this approximation, C-KLAM can now marginalize the features $f'_1$ and $f'_5$, along with the non-key elements $x_{1:3}$ and $f_{2:4}$, from $\overline{C}$ in (11A), thus ensuring that the resulting Hessian matrix remains sparse. Specifically, C-KLAM approximates $\overline{C}_2$ in (11A) by [see FIGS. 5 and 7]:

$$\overline{C}_2 \simeq C''_2(x_0, x_4; \hat{x}_0, \hat{x}_4) = \qquad (12A)$$

$$\alpha'' + g^T_{C''_2} \begin{bmatrix} x_0 - \hat{x}_0 \\ x_4 - \hat{x}_4 \end{bmatrix} = \begin{bmatrix} x_0 - \hat{x}_0 \\ x_4 - \hat{x}_4 \end{bmatrix}^T H_{C''_2} \begin{bmatrix} x_0 - \hat{x}_0 \\ x_4 - \hat{x}_4 \end{bmatrix}$$

with, $$H_{C''_2} = A_k - B_k(D - B_b^T A_b^{-1} B_b)^{-1} B_k^T \qquad (13A)$$

$$g_{C''_2} = g_{C'_2,k} + \qquad (14A)$$
$$B_k D^{-1} B_k^T \cdot (A_b^{-1} + A_b^{-1} B_b (D - B_b^T A_b^{-1} B_b)^{-1} B_b^T A_b^{-1}) g_{C'_2,b}$$

and $$D = A_r - A_{rf} A_f^{-1} A_{fr}. \qquad (15A)$$

where $\alpha''$ is a constant, independent of the optimization variables, and $g_{C''_2}$, $H_{C''_2}$ denote the Jacobian and Hessian matrix, respectively.

After this approximation, the final C-KLAM cost function becomes:

$$C_{CKLAM} = C_1(x_0, x_4, f_1, f_5; \hat{x}_{0|0}, z_{01}, z_{45}) + C''_2(x_0, x_4, \hat{x}_0, \hat{x}_4) \qquad (16A)$$

whose corresponding Hessian would be the same as that of $C_1$ (and thus sparse) plus an additional information (relative pose) constraint between $x_0$ and $x_4$ due to $C''_2$. In summary, by approximating $C_2$ by $C''_2$, C-KLAM is able to incorporate most of the information from the non-key poses/landmarks, while maintaining the sparsity of the Hessian matrix. Moreover, the part of the cost function, $C_1$, corresponding to the key poses/landmarks, remains intact.

Lastly, the approximation (marginalization) described above can be carried out with cost cubic in the number of marginalized non-key poses, and only linear in the number of marginalized non-key landmarks. For the complexity analysis, let us assume that we have $M_r$ non-key poses and $M_f$ non-key features to be marginalized, and $M_b$ features that are observed from both key and non-key frames, where $M_f \gg M_r$ and $M_f \gg M_b$. The marginalization step involves the computation of the Hessian matrix, $H_{C''_2}$, and the Jacobian, $g_{C''_2}$, according to (13AError! Reference source not found.)-(15A). For computing both the Hessian and the Jacobian, we first need to calculate D in (15AError! Reference source not found.). Since $A_f$ is block-diagonal, $A_f^{-1}$ in (15A) can be computed with cost only $O(M_f)$. Moreover, since the number of marginalized non-key features, $M_f$, far exceeds $M_r$ and $M_b$, the cost of computing D remains $O(M_f)$. To compute the Hessian [see (13A)], note that $A_b$ is also block-diagonal, hence obtaining $(D - B_b^T A_b^{-1} B_b)^{-1}$, which is the most computationally-intensive operation in (13A), requires $O(M_r^3)$ operations. The cost of calculating the remaining matrix multiplications and additions in (13AError! Reference source not found.) is significantly lower as compared to this cubic cost.

To compute the Jacobian, $g_{C''_2}$ [see (14A)], we can reuse the values of D, $(D - B_b^T A_b^{-1} B_b)^{-1}$, and $A_b^{-1}$, which have already been calculated when computing the Hessian. In addition, we need to compute $D^{-1}$, which can be found with complexity $O(M_r^3)$. The rest of the computations involve only matrix-vector multiplications and vector additions at a negligible cost.

Hence, the overall cost of the marginalization step is cubic in the number of marginalized non-key poses, and only linear in the number of marginalized non-key landmarks. Since $M_r$ is bounded (user defined), the marginalization in C-KLAM can be carried out with minimal computational overhead.

Experimental Results

The experimental setup consists of a PointGrey Chameleon camera and a Navchip IMU, rigidly attached on a light-weight (100 g) platform. The IMU signals were sampled at a frequency of 100 Hz while camera images were acquired at 7.5 Hz. The experiment was conducted in an indoor environment where the sensor platform followed a 3D rectangular trajectory, of total length of 144 m, and returned back to the initial position in order to provide an estimate of the final position error.

In the C-KLAM implementation, the corresponding approximate batch-MAP optimization problem was solved every 20 incoming camera frames. The exploration epoch was set to 60 camera frames, from which the first and last 10 consecutive camera frames were retained as keyframes, while the rest were marginalized using the C-KLAM techniques described herein. The performance of C-KLAM was compared to that of the computationally-intensive, batch MAP-based SLAM [bundle adjustment (BA)], which optimizes over all camera poses and landmarks, using all available measurements, to provide high-accuracy estimates as the comparison baseline. In the BA implementation, the batch-MAP optimization problem was solved every 20 incoming camera frames.

Figure 8:
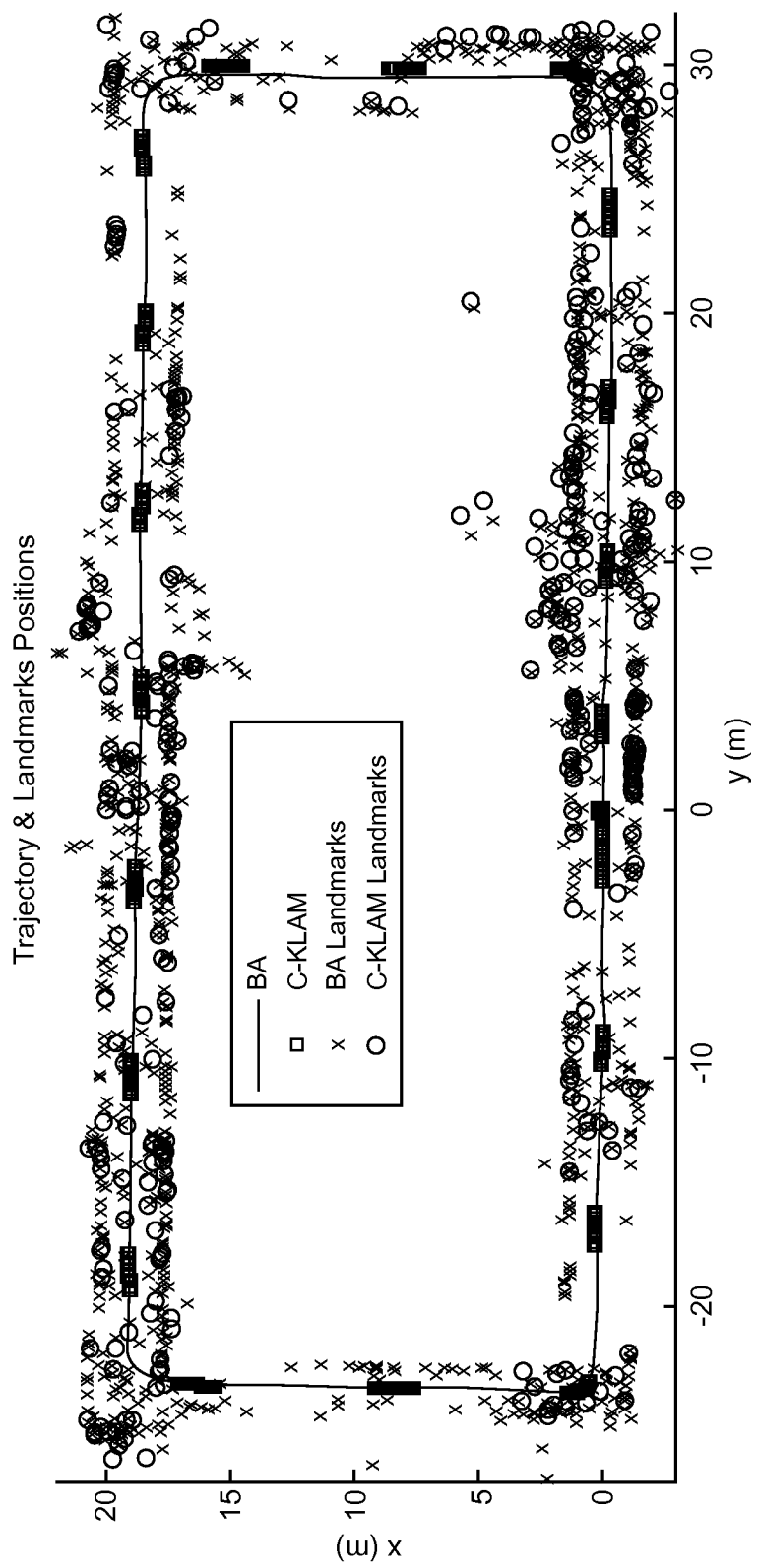
FIG. 8 shows the x-y view of the estimated trajectory and landmark positions.

FIG. 8 provides a simulated overhead x-y view of the estimated 3D trajectory and landmark positions. The C-KLAM estimates only keyframes (marked with squares) and key features (marked with circles), while BA estimates the entire trajectory (marked by the solid line) and all features (marked by X's). FIG. 8 shows the x-y view of the estimated trajectory and landmark positions. As evident, the estimates of the robot trajectory and landmark positions generated by the C-KLAM techniques described herein are almost identical to those of the BA technique. Loop closure was performed and the final position error was 7 cm for C-KLAM, only 5% more than that of the BA.

In terms of speed, C-KLAM took only 4% of the time required for the entire BA. At the end of this experiment, C-KLAM retained 238 keyframes and 349 key landmarks, while BA had 1038 camera frames and 1281 landmarks. This significant reduction in the number of estimated states in C-KLAM led to substantial improvement in efficiency. Moreover, by using information from non-keyframes to constrain the keyframes, C-KLAM was able to achieve estimation performance comparable to that of the BA.

Figure 9:
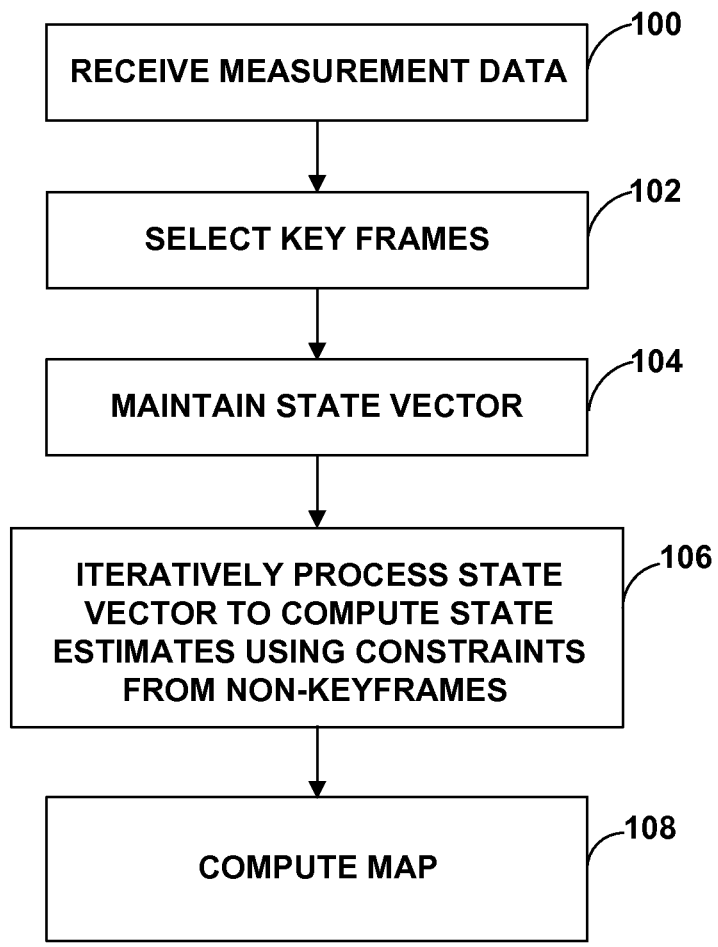
FIG. 9 is a flowchart illustrating example operation of a device in accordance with the techniques described herein.

FIG. 9 is a flowchart illustrating example operation of a device in accordance with the techniques described herein. The device may, for example, comprise a vision-aided inertial navigation system, mobile device, laptop, table, robot, vehicle, server, cloud-based processing system or other device having a processor or other operating environment for implementing the techniques described herein. For purposes of explanation, FIG. 9 will be described with respect to VINS 10 and estimator 22 of FIG. 1.

Initially, estimator 22 receives measurement data (100). That is, estimator 22 receives image data 14 produced by an image source 12 of the vision-aided inertial navigation system 10 for at least a first and second keyframe and one or more non-keyframes along a trajectory of the VINS. The one or more non-keyframes positioned between the first keyframe and the second keyframe along the trajectory, and each keyframe and non-keyframe may correspond to a pose (position and orientation) of VINS 10 including landmarks observed within the environment at that pose. In addition, estimator 22 receives, from an inertial measurement unit (IMU) 16, IMU data 18 indicative of motion of VINS 10 along the trajectory for the keyframes and the one or more non-keyframes. In this way, VINS 10 receives and records, within VINS data 24, image data 14 and IMU data 18 for keyframes and non-keyframes along the trajectory.

Estimator 22 selects frames along the trajectory for which respective state estimates are to be computed within a state vector (102). That is, estimator 22 determines which of the frames along the trajectory are to be treated as key frames for which complete estimates are computed. In one example, state estimates include complete pose information (position and orientation) for VINS 10 as well as position information for each feature observable at that frame. Estimator 22 may select the keyframes based on a set of criteria, such as one or more of a distance traveled between two consecutive key poses and poses at which points of interest were detected within the image data.

Based on the selection, estimator 22 maintains a state vector to specify, for computation, state estimates (variables) for each keyframe pose of the VINS and each landmark observed from the keyframe (104). Estimator 22 excludes variables for non-keyframe poses or landmarks observed only from non-keyframes.

Estimator 22 iteratively processes the state vector to compute state estimates for each keyframe pose of the VINS and each landmark observed from each of the keyframes without computing an state estimates for poses of the VINS at non-key frames or estimated positions for landmarks observed from only the non-keyframes (106). At this time, estimator 22 includes within the computation constraints on the poses associates with each keyframe from the preceding keyframe, where the pose constrains are based on the IMU data and the image data associated with the non-keyframes between the keyframes. In addition, estimator 22 may similarly constrain the computed estimated position of each key landmark based on the IMU data and the image data from the one or more non-keyframes. Alternatively, estimator 22 may compute the estimated positions for each key landmark specified within the state vector based only on the measurements associated with the key frames by disregarding the IMU data and the image data for the non-keyframes, thereby achieving further efficiency.

Estimator 22 may compute each of the constraints as (i) an estimate of the motion from the first keyframe to the second keyframe (i.e., how much VINS 10 has moved and/or rotated between the two keyframes), and (ii) a covariance (or information matrix) providing an indication of an uncertainty of the estimated motion. Moreover, when constraining the state estimates between keyframes, estimator 22 treats a feature observed within the image data for the keyframes as different from that same feature observed within the image data for the non-keyframes. In other words, for purposes of computing the state estimates for keyframes, estimator 22 may disregard dependencies for each of the landmarks with respect to landmarks observed within the image data for the one or more non-keyframes.

Based on the computed state estimates, estimator 22 may construct a map, e.g., a 2D or 3D map, of the environment (108). The map may, for example, include position and orientation information for the VINS along the trajectory relative to position information for any landmarks observed by the VINS. The map may be displayed, stored, used for subsequent navigation and the like.

Figure 10:
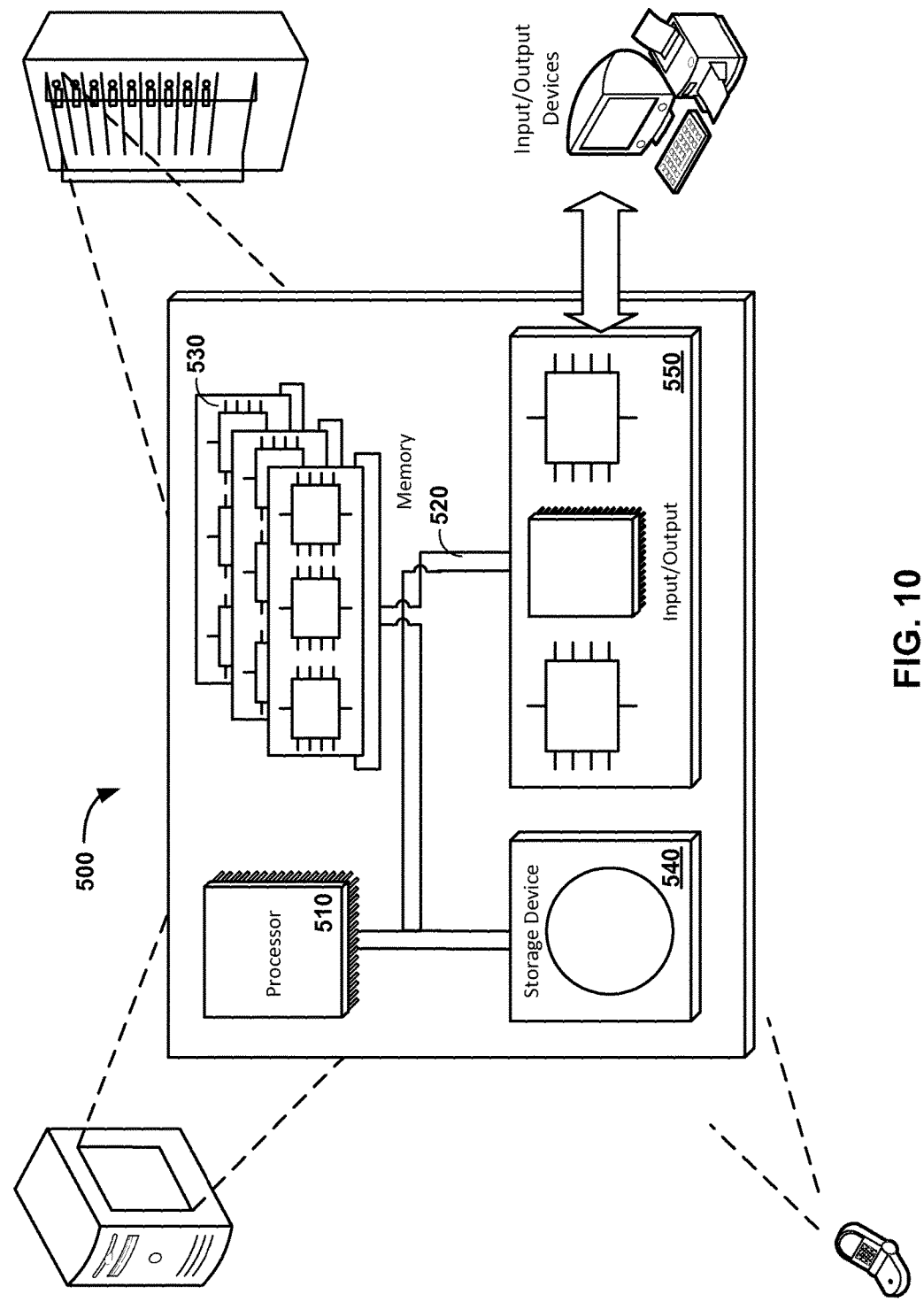
FIG. 10 shows a detailed example of various devices that may be configured to implement some embodiments in accordance with the current disclosure.

FIG. 10 shows a detailed example of various devices that may be configured to implement some embodiments in accordance with the current disclosure. For example, device 500 may be a mobile sensing platform, a mobile phone, a workstation, a computing center, a cluster of servers or other example embodiments of a computing environment, centrally located or distributed, capable of executing the techniques described herein. Any or all of the devices may, for example, implement portions of the techniques described herein for vision-aided inertial navigation system.

In this example, a computer 500 includes a hardware-based processor 510 that is operable to execute program instructions or software, causing the computer to perform various methods or tasks, such as performing the enhanced estimation techniques described herein. Processor 510 may be a general purpose processor, a digital signal processor (DSP), a core processor within an Application Specific Integrated Circuit (ASIC) and the like. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. As another example, computer 500 may provide an operating environment for execution of one or more virtual machines that, in turn, provide an execution environment for software for implementing the techniques described herein.

The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Further example details are illustrated in Appendix I, the contents of which are included herein as part of the specification.

Various embodiments of the invention have been described. These and other embodiments are within the scope of the following claims.

The invention claimed is:

1. A vision-aided inertial navigation system comprising:
an image source to produce image data for a first keyframe, one or more non-keyframes and a second keyframe along a trajectory of the vision-aided inertial navigation system (VINS), the one or more non-keyframes located between the first keyframe and second keyframe along the trajectory;
an inertial measurement unit (IMU) to produce IMU data indicative of a motion of the VINS along the trajectory for the keyframe and the one or more non-keyframes; and
a processing unit comprising an estimator that processes the IMU data and the image data to compute respective state estimates for a position and orientation of the VINS for the first keyframe and for the second keyframe,
wherein, when computing the state estimates, the estimator constrains the state estimates for the second keyframe relative to the state estimates for the first keyframe based on the IMU data and the image data from the one or more non-keyframes, and
wherein, when constraining the state estimates, the estimator treats a landmark observed within the image data for the first keyframe or the second keyframe as different from the same landmark observed within the image data for the non-keyframes.

2. The vision-aided inertial navigation system of claim 1, wherein the estimator processes the IMU data and the image data associated with the non-keyframes to compute one or more constraints to the position and the orientation of the VINS for the second keyframe relative to the position and the orientation of the VINS for the first keyframe, and
where in the estimator applies the one or more constraints when computing the state estimates of the VINS for the second keyframe.

3. The vision-aided inertial navigation system of claim 2, wherein the estimator computes each of the constraints as an estimate of motion from the first keyframe to the second keyframe, and a covariance indicating an uncertainty of the estimated motion.

4. The vision-aided inertial navigation system of claim 1, wherein the estimator computes the respective state estimates for the first keyframe and the second keyframe without computing state estimates for the position and the orientation of the VINS for each of the non-keyframes.

5. The vision-aided inertial navigation system of claim 1, wherein the estimator computes the state estimates to include a respective estimated position of each landmark observed for the first keyframe and the second keyframe, and
wherein, when computing the state estimates for the second keyframe, the estimator constrains the position and orientation of the VINS within the second keyframe based on the IMU data and the image data from the one or more non-keyframes while disregarding dependencies for each of the landmarks with respect to landmarks observed within the image data for the one or more non-keyframes.

6. The vision-aided inertial navigation system of claim 1, wherein the processing unit computes estimates for positions of landmarks observed from the first keyframe and the second keyframe without computing estimates for positions of landmarks observed only from the non-keyframes for which a respective pose of the VINS is not computed.

7. The vision-aided inertial navigation system of claim 1, wherein the processing unit maintains a state vector that specifies, for computation, state estimates the position and the orientation of the VINS for the first keyframe and one or more landmarks observed from the first keyframe or the second keyframe without including variables for non-keyframe poses or landmarks observed only from non-keyframes, wherein the estimator unit iteratively processes the state vector to compute the state estimates, and wherein, for each iteration, the estimator constrains updates for the state estimates for the position and orientation of the VINS and the landmarks observed from the keyframes for the VINS based on the IMU data and the image data for the one or more non-keyframes of the VINS.

8. The vision-aided inertial navigation system of claim 7, wherein the estimator selects key frames along the trajectory for which respective state estimates are to be computed within the state vector, and wherein the estimator selects the key frames based on a set of criteria comprising one or more of a distance traveled between two consecutive key poses and poses at which points of interest were detected within the image data.

9. The vision-aided inertial navigation system of claim 1, wherein the estimator builds a map of the environment to include the state estimates of the VINS.

10. The vision-aided inertial navigation system of claim 1, wherein the vision-aided inertial navigation system is integrated within a mobile phone or a robot.

11. A method for computing state estimates for a vision-aided inertial navigation system (VINS) comprising:

receiving image data produced by an image source of the vision-aided inertial navigation system for a first keyframe, one or more non-keyframes and a second keyframe along a trajectory of the vision-aided inertial navigation system (VINS), the one or more non-keyframes located between the first keyframe and second keyframe along the trajectory;

receiving, from an inertial measurement unit (IMU), IMU data indicative of motion of the VINS along the trajectory for the keyframe and the one or more non-keyframes; and processing the IMU data and the image data to compute respective state estimates for a position and orientation of the VINS for the first keyframe and for the second keyframe, wherein computing the state estimates comprises constraining the state estimates for the second keyframe relative to the state estimates for the first keyframe based on the IMU data and the image data from the one or more non-keyframes, and wherein constraining the state estimates comprises treating a landmark observed within the image data for the first keyframe and the second keyframe as different from the same landmark observed within the image data for the non-keyframes.

12. The method of claim 11, wherein computing the state estimates for the keyframe comprises:

processing the IMU data and the image data associated with the non-keyframes to compute one or more constraints to the position and the orientation of the VINS for the second keyframe relative to the position and the orientation of the VINS for the first keyframe; and applying the one or more constraints when computing the state estimates of the VINS for the keyframe.

13. The method of claim 12, wherein processing the IMU data and the image data associated with the non-keyframes to compute one or more constraints comprises computing each of the constraints as (i) an estimate of motion from the first keyframe to the second keyframe, and (ii) a covariance indicating an uncertainty of the estimated motion.

14. The method of claim 11, wherein computing the state estimates for the keyframe comprises computing the respective state estimates for the first keyframe and the second keyframe without computing state estimates for the position and the orientation of the VINS for each of the non-keyframes.

15. The method of claim 11, wherein computing the state estimates for the keyframe comprises:

computing the state estimates to include a respective estimated position of each landmark observed for the first keyframe and the second keyframe, and computing the state estimates for the second keyframe by constraining the position and orientation of the VINS within the second keyframe based on the IMU data and the image data from the one or more non-keyframes while disregarding dependencies for each of the landmarks with respect to landmarks observed within the image data for the one or more non-keyframes.

16. The method of claim 11, wherein computing the state estimates for the keyframe comprises:

maintaining a state vector that specifies, for computation, state estimates for the position and the orientation of the VINS for the first keyframe and one or more landmarks observed from the first keyframe or the second keyframe without including variables for non-keyframe poses or landmarks observed only from non-keyframes; and iteratively processing the state vector to compute the state estimates.

17. The method of claim 16, wherein iteratively processing the state vector comprises, for each iteration, constraining computation of the state estimates for the position and orientation of the VINS and the landmarks observed from the first keyframe or the second keyframe based on the IMU data and the image data for the one or more non-keyframes of the VINS.

18. The method of claim 11, further comprising selecting key frames along the trajectory for which respective state estimates are to be computed based on a set of criteria comprising one or more of a distance traveled between two consecutive key poses and poses at which points of interest were detected within the image data.

19. The method of claim 11, further comprising constructing a map of the environment to include the state estimates of the VINS.

20. A mobile device comprising:

an image source to produce image data for a first keyframe, one or more non-keyframes and a second keyframe along a trajectory of the vision-aided inertial navigation system (VINS), the one or more non-keyframes located between the first keyframe and second keyframe along the trajectory;

an inertial measurement unit (IMU) to produce IMU data indicative of a motion of the VINS along the trajectory for the keyframe and the one or more non-keyframes; and a processor configured to compute respective state estimates for a respective position and orientation of the VINS for the first keyframe and for the second keyframe, wherein, when computing the state estimates, the processor constrains the state estimates for the second keyframe relative to the state estimates for the first keyframe based on the IMU data and the image data from the one or more non-keyframes.

21. The mobile device of claim 20, wherein, when constraining the state estimates, the estimator treats a landmark observed within the image data for the first keyframe and the second keyframe as different from the same landmark observed within the image data for the non-keyframes.

22. A non-transitory computer-readable storage device comprising program code to cause a processor to:
receive image data produced by an image source of the vision-aided inertial navigation system for a first keyframe, one or more non-keyframes and a second keyframe along a trajectory of the vision-aided inertial navigation system (VINS), the one or more non-keyframes located between the first keyframe and second keyframe along the trajectory;
receive, from an inertial measurement unit (IMU), IMU data indicative of motion of the VINS along the trajectory for the keyframe and the one or more non-keyframes; and
process the IMU data and the image data to compute state estimates for a position and orientation of the VINS within the second keyframe by constraining the state estimates relative to state estimates for the position and orientation of the VINS within the first keyframe based on the IMU data and the image data of the one or more non-keyframes of the VINS without computing state estimates for the position and orientation of the VINS for the one or more non-keyframes.

23. The non-transitory computer-readable storage device of claim 22, wherein, when constraining the state estimates, the processor treats a landmark observed within the image data for the first keyframe and the second keyframe as different from the same landmark observed within the image data for the non-keyframes by disregarding dependencies for landmarks observed within the first keyframe or the second keyframe with respect to landmarks observed within the image data for the one or more non-keyframes.

24. A vision-aided inertial navigation system comprising:
an image source to produce image data for a first keyframe, one or more non-keyframes and a second keyframe along a trajectory of the vision-aided inertial navigation system (VINS), the one or more non-keyframes located between the first keyframe and second keyframe along the trajectory;
an inertial measurement unit (IMU) to produce IMU data indicative of a motion of the VINS along the trajectory for the keyframe and the one or more non-keyframes; and
a processing unit comprising an estimator that processes the IMU data and the image data to compute respective state estimates for a position and orientation of the VINS for the first keyframe and for the second keyframe,
wherein, when computing the state estimates, the estimator constrains the state estimates for the second keyframe relative to the state estimates for the first keyframe based on the IMU data and the image data from the one or more non-keyframes.

25. The vision-aided inertial navigation system of claim 24,
wherein, when constraining the state estimates, the estimator computes a plurality of constraints based on the image data and the IMU data for the non-keyframes and applies the constraints to the state estimates of the VINS for the second keyframe.

26. The vision-aided inertial navigation system of claim 25, wherein, when computing each of the constraints, the estimator treats a landmark observed within the image data for the first keyframe or the second keyframe as different from the same landmark observed within the image data for the non-keyframes.

27. The vision-aided inertial navigation system of claim 25, wherein, when computing each of the constraints, the estimator treats at least one keyframe as different keyframes for each of the constraints.

* * * * *

UNITED STATES PATENT AND TRADEMARK OFFICE
CERTIFICATE OF CORRECTION

PATENT NO. : 9,607,401 B2
APPLICATION NO. : 14/271971
DATED : March 28, 2017
INVENTOR(S) : Stergios I. Roumeliotis and Esha D. Nerurkar It is certified that error appears in the above-identified patent and that said Letters Patent is hereby corrected as shown below:

Column 15, Line 64: Replace "according to (13AError! Reference source not found.)-(15A)." with -- according to (13A)-(15A). --

Column 15, Line 66: Replace "first need to calculate D in (15AError! Reference source not found.)." with -- first need to calculate D in (15A). --

Column 16, Line 8: Replace "additions in (13AError! Reference source not found.)" with -- additions in (13A) --

Signed and Sealed this
Thirty-first Day of July, 2018

Andrei Iancu
*Director of the United States Patent and Trademark Office*